United States Patent [19]

Kuniyoshi et al.

[11] 4,208,674
[45] Jun. 17, 1980

[54] TIME BASE ERROR CORRECTING APPARATUS

[75] Inventors: Yasunobu Kuniyoshi, Tokyo; Takashi Okada, Yamato; Takao Sumi, Tokyo, all of Japan

[73] Assignee: Sony Corporation, Tokyo, Japan

[21] Appl. No.: 851,408

[22] Filed: Nov. 14, 1977

[30] Foreign Application Priority Data

| Nov. 16, 1976 | [JP] | Japan | 51-138079 |
| Nov. 20, 1976 | [JP] | Japan | 51-139811 |
| Nov. 30, 1976 | [JP] | Japan | 51-144566 |
| Dec. 23, 1976 | [JP] | Japan | 51-155241 |

[51] Int. Cl.² .................................... H04N 5/76
[52] U.S. Cl. .................................... 358/8; 360/36
[58] Field of Search ............... 360/36, 26, 27, 28; 358/8; 331/11, 10, 12, 14

[56] References Cited

U.S. PATENT DOCUMENTS

| 3,499,984 | 3/1970 | Inoue | 360/36 |
| 3,528,026 | 9/1970 | Groendycke | 331/11 |
| 3,637,936 | 1/1972 | Krause | 358/8 |
| 3,939,485 | 2/1976 | Amari | 358/4 |
| 3,953,882 | 4/1976 | Arimura | 358/8 |
| 4,012,774 | 3/1977 | Kuniyoshi | 358/8 |
| 4,069,462 | 1/1978 | Dunn | 331/11 |

OTHER PUBLICATIONS

"Digital Time-Base Correction for Video Signal Processing", by Acker & McLean, SMPTE Journal, Mar., 1976, vol. 85, pp. 146-150.

Primary Examiner—Bernard Konick
Assistant Examiner—Alan Faber
Attorney, Agent, or Firm—Lewis H. Eslinger; Alvin Sinderbrand

[57] ABSTRACT

In apparatus for processing an information signal, such as, the chrominance component of a reproduced color video signal, time base errors composed of phase and frequency errors are eliminated by detecting phase and frequency errors, respectively, of the chrominance component, frequency converting the chrominance component with a frequency converting signal which is generated, at least in part, by means of a variable frequency oscillator, controlling such oscillator by an automatic phase control circuit (APC) in response to detected phase errors within a predetermined or lock-in range of the APC so as to eliminate such phase errors from the frequency converted chrominance component, and further controlling the variable frequency oscillator in response to only those detected frequency errors which correspond to time base errors beyond the lock-in range of the APC for returning to within such range.

27 Claims, 13 Drawing Figures

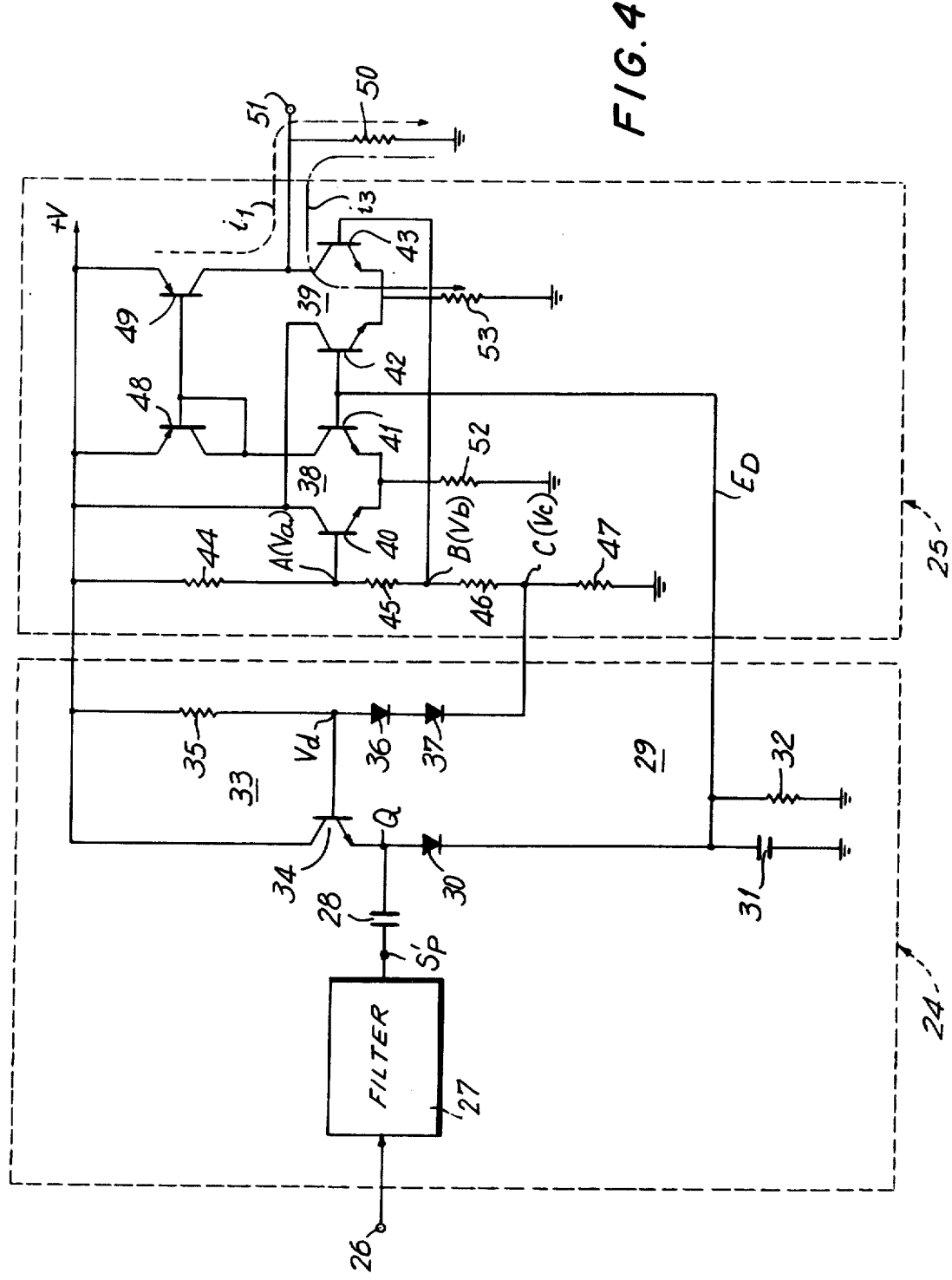

TIME BASE ERROR CORRECTING APPARATUS

BACKGROUND OF THE INVENTION

1. Field of the Invention

This invention relates generally to the processing of an information signal for eliminating time base errors therefrom, and more particularly is directed to improve color video signal recording and/or reproducing apparatus in which the reproduced video signal is processed so as to cancel or eliminate time base errors contained in the chrominance component of the reproduced color video signal.

2. Description of the Prior Art

A well known apparatus for magnetically recording and/or reproducing video signals includes a rotary guide drum provided with two alternately operative transducers or heads. A magnetic tape is wrapped helically about a portion of the periphery of the guide drum and is moved longitudinally while the heads are rotated, thus causing the heads alternately to scan respective parallel tracks extending obliquely on the tape for recording or reproducing signals in such tracks.

When recording color video signals which include luminance and chrominance components, it is known to separate such components and then to frequency modulate a relatively high frequency carrier with the luminance component, while the chrominance component is down-converted or frequency converted so as to have its frequency band shifted below the frequency band of the frequency modulated luminance component, whereupon the frequency modulated luminance component and the frequency converted chrominance component are combined to provide a composite video signal which is recorded in the successive parallel oblique tracks on the magnetic tape. Upon reproducing, the composite video signal reproduced from each track is separated into its luminance and chrominance components, and the frequency modulated luminance component is demodulated, while the frequency converted chrominance component is reconverted to the original frequency band, whereupon the frequency demodulated luminance component and the frequency reconverted chrominance component are recombined to provide a reproduced standard television signal.

In the above described existing apparatus for recording and reproducing color video signals, the reproduced video signals usually contain time base errors, so-called jitter, due to mechanical vibrations generated in the tape transport mechanism and fluctuations in the rotation of the rotary transducers or heads. Such time base errors have a particularly serious effect on the chrominance component, whereby the hue of the reproduced color television picture is greatly disturbed.

In order to eliminate or cancel time base errors from the reproduced chrominance component, it has been proposed, for example, as disclosed in detail in U.S. Pat. No. 3,803,347, to provide a so-called automatic frequency control circuit (AFC) in association with the circuit for producing the frequency converting signal by which the reproduced chrominance component is reconverted to the original frequency band. In such automatic frequency control circuit, a variable frequency or voltage controlled oscillator (VCO) included in the circuit for producing the frequency converting signal has its output supplied to a frequency divider so as to provide an output frequency nominally equal to the standard horizontal or line frequency of the video signal, and a comparator compares the output of the frequency divider with horizontal synchronizing signals separated from the demodulated luminance component so as to provide a resulting comparator output voltage for controlling the frequency of the output from the voltage controlled oscillator. Although the foregoing arrangement has as its object to eliminate time base errors from the reconverted chrominance component, the compensation for such time base errors is only effected on the basis of the horizontal or line synchronizing signals included in the reproduced luminance component and, therefore, no provision is made to compensate for, or eliminate those relatively small time base errors ocurring in the intervals between the successive horizontal or line synchronizing signals.

It has also been proposed, for example, as disclosed in detail in U.S. Pat. No. 2,921,976, to compensate for or eliminate time base errors from the reproduced chrominance component by means of a so-called automatic phase control circuit (APC). In such automatic phase control circuit, the burst signal is extracted from the reconverted chrominance component and compared, in a phase comparator, with the output of a fixed frequency oscillator having the standard color subcarrier frequency. The resulting comparator output is employed to control a variable frequency oscillator of the circuit for generating the frequency converting signal by which the reproduced chrominance component is reconverted to the standard or original frequency band therefor in a frequency converter or modulator. The aforesaid automatic phase control circuit has a predetermined lock-in range and, therefore, when a sudden change, such as, a so-called skew jitter, is introduced in the reproduced color video signal, the resulting large and abrupt time base error is beyond the lock-in range of the APC circuit and cannot be immediately compensated for or eliminated by the APC circuit.

In view of the foregoing, it has been proposed, for example, as disclosed in detail in U.S. Pat. No. 3,723,638, to provide a color video signal recording and reproducing apparatus in which, during reproducing, an automatic frequency and phase control circuit (AFPC) seeks to control the frequency converting signal by which the reproduced chrominance component is reconverted to the standard color subcarrier frequency so as to eliminate or remove time base errors from the reproduced chrominance component. In such AFPC circuit the burst is extracted from the frequency reconverted chrominance component and compared with the output of a fixed frequency oscillator to provide a first control signal, and the horizontal synchronizing signals are separated from the demodulated luminance component to provide a second control signal, and the first and second control signals are simultaneously employed at least during every horizontal interval for controlling the phase and frequency of the frequency converting signal. However, at times, the first and second control signals respectively responsive to the phase of the color burst signals and the frequency of the horizontal synchronizing signals may seek to achieve contrary changes in the frequency converting signal with the result that the time base error is not completely cancelled or eliminated.

OBJECTS AND SUMMARY OF THE INVENTION

Accordingly, it is an object of this invention to provide an apparatus for processing an information signal, such as, the chrominance component of a reproduced color video signal, so as to eliminate time base errors therefrom while avoiding the previously described disadvantages of the apparatus heretofore proposed for that purpose.

Another object is to provide an improved color video signal recording and/or reproducing apparatus in which, during reproducing, time base errors are completely and reliably removed from the reproduced chrominance component.

More specifically, it is an object of this invention to provide an apparatus, as aforesaid, which rapidly effects the complete and reliable elimination of both phase and frequency errors occurring in the reproduced chrominance component of a color video signal.

In accordance with an aspect of this invention, in an apparatus for processing an information signal, such as, the chrominance component of a reproduced color video signal, the phase and frequency errors which comprise the time base errors are separately detected, the reproduced chrominance component is frequency converted with a frequency converting signal generated, at least in part, by means of a variable frequency oscillator which is controlled by an automatic phase control circuit in response to detected phase errors within a predetermined or lock-in range of the automatic phase control circuit, and the variable frequency oscillator is further controlled only in response to those detected frequency errors which correspond to time base errors beyond the lock-in range of the automatic phase control circuit.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIG. 4 is a circuit diagram showing details of a frequency detector and threshold amplifier that may be employed in the circuit of FIG. 1;

DETAILED DESCRIPTION OF PREFERRED EMBODIMENTS

Figure 1:
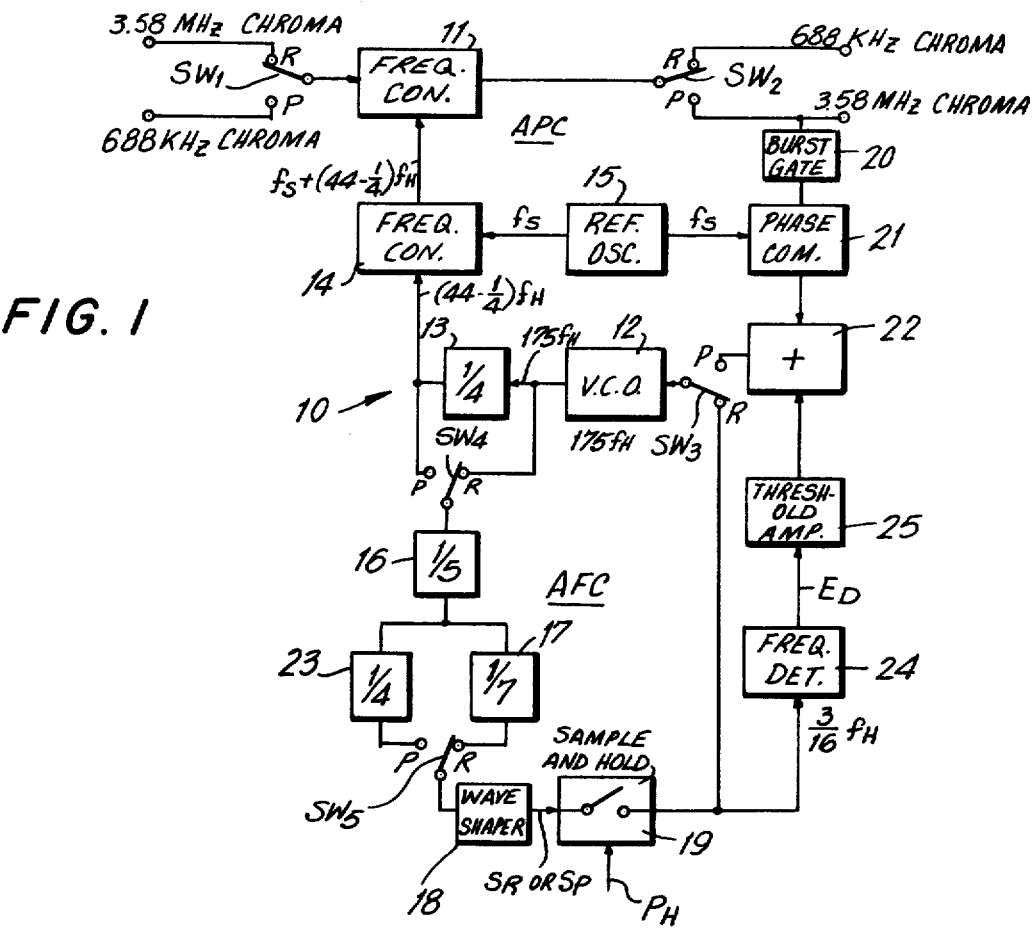
FIG. 1 is a block diagram of a circuit according to an embodiment of this invention for processing the chrominance component of a color video signal upon the recording and reproducing thereof.

Referring to the drawings in detail, and initially to FIG. 1 thereof, it will be seen that the invention is there shown embodied in a circuit 10 for processing the chrominance component of a color video signal during the recording and reproducing of the latter. The circuit 10 has record-playback switches $SW_1$, $SW_2$, $SW_3$, $SW_4$ and $SW_5$ which are suitably interconnected or ganged so as to be simultaneously changed-over between recording positions and playback or reproducing positions in which the movable contacts of the switches engage record contacts R, as shown, or playback contacts P, respectively.

In the recording operation of processing circuit 10, an information signal, for example, the chrominance component of an NTSC color video signal having a standard color subcarrier frequency of 3.58 MHz, is applied to contact R of switch $SW_1$ for transmission through the latter to a frequency converter 11 in which the chrominance component is frequency converted so as to have a relatively low color subcarrier frequency, for example, of 688 KHz. The resulting frequency converted chrominance component issuing from frequency converter 11 is obtained at the contact R of switch $SW_2$ and has its frequency band shifted below the frequency band of a frequency modulated luminance component which is conventionally obtained by frequency modulating a relatively high frequency carrier with the liminance component of the color video signal, whereupon, the frequency modulated luminance component and the frequency converted chrominance component are combined to provide a composite video signal which may be recorded in a conventional manner in successive parallel oblique tracks on a magnetic tape.

The frequency conversion of the chrominance component from its standard color subcarrier frequency $f_S$ of 3.58 MHz to the relatively low color subcarrier frequency of 688 KHz equal to $(44-\frac{1}{4})f_H$, in which $f_H$ is the horizontal or line frequency 15.75 KHz of the video signal, is achieved in frequency converter 11 by applying to the latter a frequency converting signal having the frequency $f_S+(44-\frac{1}{4})f_H$. In order to obtain such frequency converting signal, the processing circuit 10 according to this invention is shown to include a variable frequency or voltage controlled oscillator 12 which generates an oscillating signal having a center frequency of $175f_H$. The oscillating signal with a center frequency of $175f_H$ is applied to a frequency divider 13 by which the output of voltage controlled oscillator 12 has its frequency divided by four so as to provide an output signal from frequency divider 13 with the frequency $(44-\frac{1}{4})f_H$. Such output from frequency divider 13 is applied to a frequency converter 14 which also receives an oscillating signal having the standard color subcarrier frequency $f_S = 3.58$ MHz from a fixed frequency or reference oscillator 15, with the result that the frequency converter 14 provides frequency converter 11 with the desired frequency converting signal having the frequency $f_S+(44-\frac{1}{4})f_H$.

Figure 2:
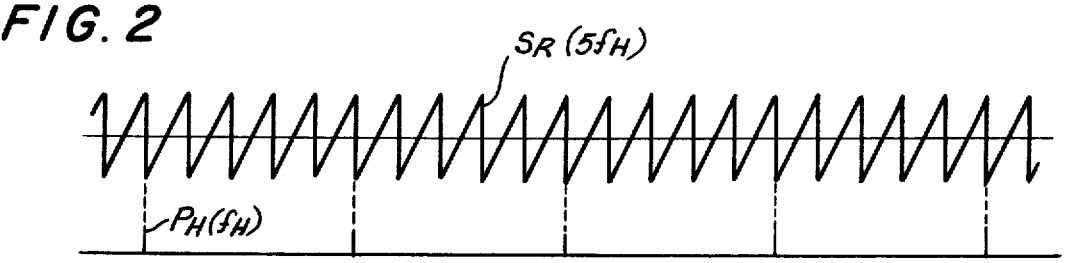
FIGS. 2 and 3 are waveforms to which reference will be made in explaining the operation of the circuit of FIG. 1.

The oscillating signal from voltage controlled oscillator 12 is further applied to contact R of switch $SW_4$ for transmission through the latter, during recording, to a frequency divider 16 in which the received signal has its frequency divided by five. The output of frequency divider 16 is supplied to a frequency divider 17 in which the received signal further has its frequency divided by seven, and the output of frequency divider 17 is applied to contact R of switch SW₅ for transmission through the latter during recording to a saw-tooth waveshaper 18. As a result of the successive divisions of the output of voltage controlled oscillator 12 by five and then by seven in frequency dividers 16 and 17, respectively, the saw-tooth wave or signal $S_R$ (FIG. 2) issuing from waveshaper 18, during recording, has a frequency of $5f_H$. Such saw-tooth wave or signal $S_R$ is applied to a sample and hold circuit 19 for sampling in the latter by horizontal synchronizing signals $P_H$ having the frequency $f_H$ and which are suitably separated from the luminance component of the color video signal being recorded. Each sampled level of the saw-tooth wave or signal $S_R$ is held in circuit 19 for a predetermined period, for example, one horizontal interval, and the sampled level or signal is applied from circuit 19 to contact R of switch SW₃ for controlling voltage controlled oscillator 12 in the sense to ensure that constant levels of the saw-tooth wave or signal $S_R$ are sampled by the horizontal synchronizing signals $P_H$. In other words, as is apparent from FIG. 2, the saw-tooth wave or signal $S_R$ is sampled every 5 cycles thereof at the constant level by the horizontal synchronizing signals $P_H$ so long as the output of voltage controlled oscillator 12 has the correct frequency $175f_H$. It will be apparent from the foregoing that voltage controlled oscillator 12, frequency dividers 16 and 17, waveshaper 18 and sample and hold circuit 19 form an automatic frequency control circuit (AFC) operative during recording and by which the oscillating signal from oscillator 12 is synchronized with the horizontal synchronizing signals $P_H$ of the color video signal being recorded.

For reproducing operation of processing circuit 10, switches SW₁-SW₅ are changed-over to engage their respective reproducing or playback contacts P, in which case the reproduced chrominance component separated from the reproduced composite video signal and having a color subcarrier frequency of 688 KHz is applied through switch SW₁ to frequency converter 11 to be reconverted in the latter to the original or standard color subcarrier frequency of 3.58 MHz, whereupon the frequency reconverted chrominance component applied to contact P of switch SW₂ may be recombined with the reproduced luminance component, after frequency demodulation of the latter, to provide a reproduced standard color video signal. The frequency reconverted chrominance component is also shown to be applied from contact P of switch SW₂ to a burst gate 20 which extracts the color burst signal from the reconverted chrominance component and applies the extracted burst signal to a phase comparator 21 for comparison, in the latter, with the reference oscillating signal from reference or fixed frequency oscillator 15. As is well known, phase comparator 21 provides a DC voltage at a level corresponding to any detected phase difference between the extracted burst signal and the reference oscillating signal provided with the frequency $f_S$ by oscillator 15, and such DC voltage from comparator 21 is applied to an adder 22 having its output connected to contact P of switch SW₃ for controlling the voltage controlled oscillator 12 during reproducing. As previously described, the oscillating signal from voltage controlled oscillator 12 is frequency-divided in divider 13 and then frequency converted with the reference oscillating signal from reference oscillator 15 to form the frequency converting signal having the frequency $f_S + (44 - \frac{1}{4})f_H$ and being supplied to frequency converter 11. Thus, the frequency converters 11 and 14, the oscillators 12 and 15 and the phase comparator 21 form an automatic phase control circuit (APC) by which small time base errors, such as, phase errors, included in the reproduced chrominance component are cancelled or eliminated from the reconverted chrominance component.

Figure 3:
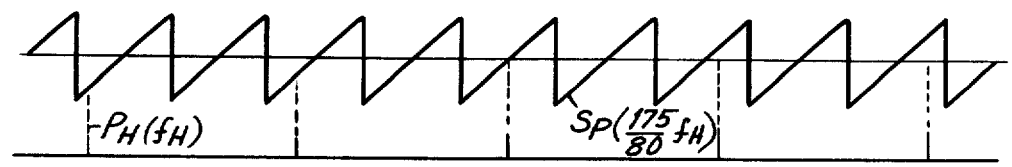

The processing circuit 10 according to this invention is further shown on FIG. 1 to have the output of frequency divider 13 also applied to contact P of switch SW₄, while a frequency divider 23 operative to divide by four is connected between the output of frequency divider 16 and contact P of switch SW₅. Thus, during reproducing, the oscillating signal produced by voltage controlled oscillator 12 with the center frequency $175f_H$ is successively divided by four, five and then four again in frequency dividers 13, 16 and 23, respectively, so that the saw-tooth wave or signal $S_P$ applied from waveshaper 18 to sample and hold circuit 19 has a frequency of $175/80f_H$. During reproducing, the saw-tooth signal $S_P$ is again sampled in circuit 19 by the horizontal synchronizing signals $P_H$ which may be suitably separated from the demodulated luminance component of the reproduced color video signal. However, it will be noted that the signal sampled during reproducing will have a frequency corresponding to the beat frequency between the signal applied to waveshaper 18 through frequency dividers 13, 16 and 23 and the horizontal synchronizing signals $P_H$. As noted before, voltage controlled oscillator 12 has a center frequency of $175f_H$ so that the frequency of the divided oscillating signal applied to waveshaper 18 during reproducing fluctuates around $175/80f_H$ which may be rewritten as $(2+3/16)f_H$. In other words, the frequency $f_X$ of the saw-tooth wave or signal $S_P$ (FIG. 3) which is to be sampled can be expressed as $(2+k)f_H$. In general, sampling theory establishes that, if a signal having a frequency $kf_H$ or $(1\pm k)f_H$, or $(2\pm k)f_H$, ---- or $(n\pm k)f_H$ is sampled by a sampling signal having the frequency $f_H$, the sampled signal will have a frequency $kf_H$ in all cases. Thus, when the saw-tooth wave or signal $S_P$ having the frequency $f_X = (2+k)f_H$ is sampled by the horizontal synchronizing signals $P_H$ having the frequency $f_H$, the sampled signal from sample and hold circuit 19 has the frequency $kf_H$, that is, in the example given, the sampled signal from circuit 19 has a center frequency of $3/16f_H$.

Such sampled signal from circuit 19 is applied to a frequency detector 24 which discriminates the frequency $kf_H$ or $3/16f_H$ of the sampled signal so as to generate a detecting voltage $E_D$ varying with the frequency difference between the actual or detected frequency of the sampled signal and the predetermined center frequency $3/16f_H$ thereof. Such detecting voltage $E_D$ from detector 24 is applied to a threshold amplifier 25 which is made to apply a corresponding DC output to adder 22 only when the detecting voltage $E_D$ from detector 24 is outside of a predetermined range. Generally, the frequency detector 24 may be constituted by a filter circuit which produces a predetermined voltage at the center frequency $3/16f_H$ of the sampled signal, with the voltage output of such filter circuit increasing and decreasing as the actual frequency $kf_H$ of the sampled signal shifts increasingly below and above, respectively, the center frequency $3/16f_H$. The threshold amplifier 25 may include a coring circuit so that the output signal from amplifier 25 to adder 22 is cored, that is, the output from threshold amplifier 25 to adder 22 is zero so long as the detecting voltage $E_D$ from frequency detector 24 is within a predetermined range, for example, the range between detecting voltages $V_a$ and $V_b$ on FIG. 6. However, the DC voltage applied by threshold amplifier 25 to adder 22 is generally proportional to the level of the detecting voltage $E_D$ when the latter is outside the predetermined range $V_a$ to $V_b$. It should be noted that the range of the detecting voltage $E_D$ for which the threshold amplifier 25 provides a zero output is determined in respect to the operation of the automatic phase control circuit (APC), that is, the threshold amplifier 25 provides a zero output to adder 22 only so long as voltage controlled oscillator 12 can be locked-in by the DC voltage signal from phase comparator 21. On the other hand, when the detected time base error exceeds the lock-in range of the automatic phase control circuit (APC), the detecting voltage $E_D$ from frequency detector 24 is outside the range $V_a$-$V_b$ within which threshold amplifier 25 provides a zero output voltage and, accordingly, a DC output voltage is applied from amplifier 25 to adder 22, with the amplitude of such DC voltage being proportional to the detecting voltage $E_D$, and with the polarity of the DC voltage from amplifier 25 being dependent on the direction of the lock-out of the automatic phase control circuit (APC). Thus, during reproducing operation of signal processing circuit 10 according to this invention, adder 22 applies only the output voltage of phase comparator 21 to voltage controlled oscillator 12 so long as the detected time base errors are within the lock-in range of the automatic phase control circuit (APC). However, upon lock-out of the automatic phase control circuit, that is, as soon as the time base error in the reproduced chrominance component exceeds the lock-in range of the automatic phase control circuit, the automatic frequency control circuit (AFC) becomes operative to apply a suitable DC control voltage from threshold amplifier 25 through adder 22 to voltage controlled oscillator 12 for immediately adjusting the frequency of the oscillating signal from oscillator 12 in the sense for returning to the lock-in range or condition of the automatic phase control circuit (APC).

Figure 5A:
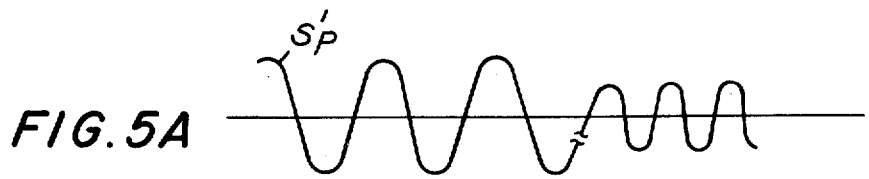
FIGS. 5A and 5B are waveforms to which reference will be made in explaining the operation of the frequency detector and threshold amplifier of FIG. 4.

Referring now to FIG. 4, it will be seen that, in specific circuit arrangements that may be used for frequency detector 24 and threshold amplifier 25, the sampled signal from sample and hold circuit 19 is applied through an input terminal 26 of frequency detector 24 to a filter circuit 27 in the latter. As previously described, filter circuit 27 may have a characteristic providing a predetermined amplitude output when the sampled signal has the frequency $3/16f_H$, with the amplitude of the output increasing and decreasing linearly from the predetermined amplitude as the frequency of the sampled signal either decreases or increases, respectively, in respect to the frequency $3/16f_H$. Therefore, as shown on FIG. 5A, filter circuit 27 provides an output signal $S'_p$ having an amplitude which varies in response to the frequency of the sampled signal, that is, output signal $S'_p$ has a predetermined amplitude when the frequency of the sampled signal from circuit 19 is equal to the intermediate frequency $3/16f_H$ of filter circuit 27, whereas the amplitude of the output signal $S'_p$ is relatively increased or reduced when the frequency of the sampled signal is either lower or higher, respectively, than the intermediate frequency of filter circuit 27.

Figure 5B:
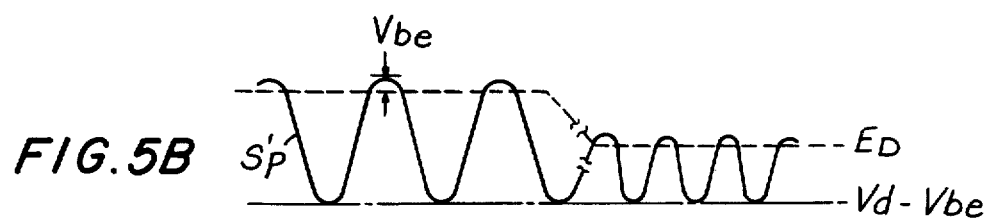

Such output signal $S'_p$ from filter circuit 27 is supplied through a decoupling condenser 28 to a peak detector or rectifying circuit 29. As shown, circuit 29 may comprise a rectifying diode 30 and a smoothing circuit constituted by a condenser 31 and a resistor 32 so that the detecting voltage $E_D$ is obtained from such smoothing circuit. Frequency detector 24 is further shown to include a clamp circuit 33 by which the voltage at the point Q or input to peak detector 29 is clamped at a predetermined voltage level. Clamp circuit 33 may comprise a transistor 34 having its collector-emitter path connected between a supply voltage source $+V$ and the point Q, and a resistor 35 and series-connected diodes 36 and 37 for dividing the supply voltage $+V$ and thereby providing a DC bias voltage $V_d$ which is supplied to the base of transistor 34. Thus, clamp circuit 33 serves to clamp the DC potential at point Q at the value ($V_d - V_{be}$), in which $V_{be}$ is the base-emitter junction voltage of transistor 34. By reason of the foregoing and as indicated on FIG. 5B, the output signal $S'_p$ from filter circuit 27 is superimposed on the clamp potential ($V_d - V_{be}$) and the resulting clamped output is rectified by diode 30, whereupon the smoothing circuit constituted by capacitor 31 and resistor 32 generates the detecting voltage $E_D$ which is smaller by the amount $V_{be}$ than the peak values of the clamped output signal $S'_p$.

As previously noted, detecting voltage $E_D$ from frequency detector 24 is supplied to threshold amplifier 25 which, as shown on FIG. 4, is essentially composed of two differential amplifiers 38 and 39 comprised of a pair of transistors 40 and 41 and a pair of transistors 42 and 43, respectively. More specifically, the detecting voltage $E_D$ is applied to the base of transistor 41 of differential amplifier 38 and the base of transistor 42 of differential amplifier 39. A number of resistors 44, 45, 46 and 47 are connected in series between supply voltage source $+V$ and a point of reference potential, such as, ground, so as to constitute a voltage divider providing a first reference voltage $V_a$ applied to the base of transistor 40 from a point A between resistors 44 and 45, and further providing a second reference voltage $V_b$ applied to the base of transistor 43 from a point B between resistors 45 and 46. It will be apparent that the first reference voltage $V_a$ is higher than the second reference voltage $V_b$. The collectors of transistors 40 and 42 are shown to be connected together directly to the supply voltage source $+V$, while the collectors of transistors 41 and 43 are shown to be connected to a current mirror circuit comprised of PNP - type transistors 48 and 49. More particularly, the emitter-collector paths of transistors 48 and 49 are shown to be connected between the supply voltage source $+V$ and the collectors of transistors 41 and 43, respectively, while the bases of transistors 48 and 49 are connected together to the collector of transistor 41. The collector of transistor 43 is further shown to be connected to a load resistor 50 and to an output terminal 51 which is, in turn, adapted to be connected to adder 22 on FIG. 1. The emitters of transistors 40 and 41 are connected together to ground through a resistor 52, and the emitters of transistors 42 and 43 are similarly connected together to ground through a resistor 53. Finally, in the circuit arrangement shown on FIG. 4, the series connected diodes 36 and 37 of clamp circuit 33 are connected to a point C between resistors 46 and 47 to provide a suitable bias voltage $V_c$ to diodes 36 and 37.

The threshold amplifier 25 described above with reference to FIG. 4 operates as follows:

When the detecting voltage $E_D$ from frequency detector 24 is higher than the first reference voltage $V_a$, transistors 41 and 42 are turned ON and transistors 40 and 43 are turned OFF. Under the foregoing conditions, a current $i_1$ flowing through transistor 41 is determined by the following equation: $i_1 = (E_D - V_{be})/R$ in which r is the resistance value of each of the resistors 52 and 53 connected to the emitters of differential amplifiers 38 and 39. It will be apparent from the foregoing equation that the current $i_1$ is substantially proportional to the voltage $E_D$. Such current $i_1$ flows through the emitter-collector path of transistor 48 in the current mirror circuit, so that the same amount of current $i_1$ flows through the emitter-collector path of transistor 49 and through load resistor 50, as indicated by a dotted line on FIG. 4. As a result, a positive DC voltage proportional to the current $i_1$ is produced across load resistor 50 for application from terminal 51 to adder 22 on FIG. 1.

When the detecting voltage $E_D$ from frequency detector 24 is between the reference voltages $V_a$ and $V_b$, transistors 40 and 42 are turned ON and transistors 41 and 43 are turned OFF. Accordingly, no currents flow through the current mirror circuit constituted by transistors 48 and 49 or through load resistor 50, so that no DC voltage appears at output terminal 51 for application to adder 22.

Finally, when the detecting voltage $E_D$ from frequency detector 24 is lower than the second reference voltage $V_b$, transistors 40 and 43 are turned ON and transistors 41 and 42 are turned OFF. Under the foregoing conditions, a current $i_3$ flows through load resistor 50 and the collector-emitter path of transistor 43, as shown in dot-dash lines on FIG. 4, with the result that a negative DC voltage proportional to the current $i_3$ is produced across load resistor 50 for application from output terminal 51 to adder 22. Such current $i_3$ is determined by the following equation $i_3 = (E_D - V_{be})/r$ from which it follows that the current $i_3$ and the negative DC voltage across load resistor 50 are substantially proportional to the voltage $E_D$.

It will be apparent from the foregoing that the output signal from threshold amplifier 25 is cored, that is, for values of the detecting voltage $E_D$ between the first and second reference voltages $V_a$ and $V_b$ which determine the threshold levels of amplifier 25, the output voltage from amplifier 25 to adder 22 is at zero level, whereas, for values of the detecting voltage $E_D$ which are above reference voltage $V_a$, the DC voltage applied from output terminal 51 to adder 22 is of positive polarity and increases progressively in accordance with the amount by which the detecting voltage $E_D$ exceeds the reference voltage $V_a$. On the other hand, when the detecting voltage $E_D$ is less than reference voltage $V_b$, the DC voltage applied from output terminal 51 to adder 22 is of negative polarity and varies with the amount by which the detecting voltage $E_D$ is smaller than the reference voltage $V_b$.

It will be apparent from the foregoing that, so long as the value of the detecting voltage $E_D$ from frequency detector 24 is within the range between reference voltages $V_a$ and $V_b$, which reference voltages are selected with reference to the lock-in range of the automatic phase control circuit (APC), adder 22 applies only the DC voltage from phase comparator 21 to voltage controlled oscillator 12 for controlling the latter only by means of the automatic phase control circuit (APC). Thus, the automatic frequency control circuit (AFC) does not interfere with the rapid and precise adjustment of the oscillating output of voltage controlled oscillator 12 by the automatic phase control (APC) for eliminating small time base errors in the reproduced chrominance component so long as such time base errors are within the lock-in range of the automatic phase control circuit. However, when a large or abrupt time base error occurs so that the same is outside the lock-in range of the automatic phase control circuit (APC), the resulting horizontal synchornizing signal $P_H$ causes the corresponding detecting voltage $E_D$ to be similarly outside the range between reference voltages $V_a$ and $V_b$ with the result that threshold amplifier 25 applies a suitable DC voltage through adder 22 to voltage controlled oscillator 12 for effecting a relatively large change in the output of the latter in the sense which returns the burst signal of the frequency reconverted chrominance component to within the lock-in range of the automatic phase control circuit. Thus, in the reproducing operation of the signal processing circuit 10 shown on FIG. 1, the automatic frequency control circuit (AFC) cooperates with frequency detector 24 and threshold amplifier 25 for further controlling the voltage controlled oscillator 12 only in response to those detected frequency errors which correspond to time base errors beyond the lock-in range of the automatic phase control circuit (APC).

Figure 7:
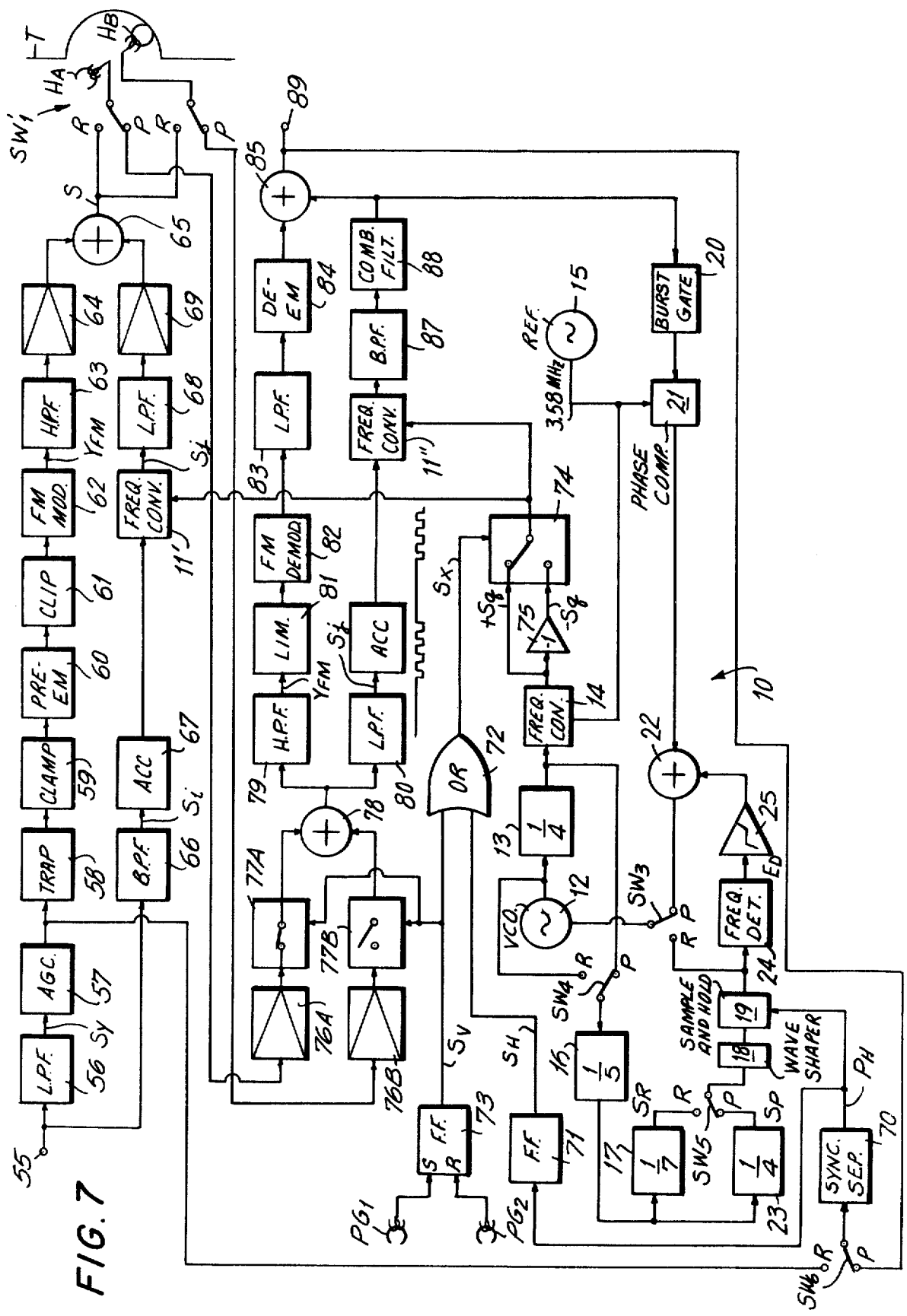
FIG. 7 is a block diagram of a color video signal recording and/or reproducing apparatus including a chrominance component processing circuit embodying this invention and which is generally of the type shown on FIG. 1.

Referring now to FIG. 7, it will be seen that the present invention may be advantageously employed for eliminating time base errors in the chrominance component of a color video signal which is recorded and reproduced in an apparatus of the so-called helical scan type, and particularly in an apparatus in which interfering signals due to cross-talk in respect to the chrominance component are eliminated by recording the chrominance component with different carriers in adjacent oblique or skewed parallel tracks on a magnetic tape.

In the recording section of the apparatus shown on FIG. 7, an input terminal 55 receives a color video signal to be recorded and which includes luminance and chrominance components composed of line, field and frame intervals with blanking and synchronizing portions in each of those intervals. Such color video signal is applied from terminal 55 to a low pass filter 56 which transmits substantially only the luminance component $S_Y$ to an automatic gain control circuit 57. The gain controlled luminance component from circuit 57 is applied through a trap circuit 58 to a clamp circuit 59 which clamps the sync-tip level of the luminance component to a fixed reference level. Thereafter, the clamped luminance component is passed through a pre-emphasis circuit 60 to a clip circuit 61 and, through the latter, to a frequency modulator 62 in which the luminance component frequency modulates a suitably high frequency carrier. The resulting frequency modulated luminance component $Y_{FM}$ issuing from modulator 62 is passed through a high-pass filter 63 and a recording amplifier 64 to one input of an adding or mixing circuit 65.

The color video signal applied to input terminal 55 is also supplied from the latter to a band pass filter 66 which separates the chrominance component $S_i$ from the color video signal and passes such chrominance component through an automatic color control circuit 67 to a frequency converter 11' which corresponds to the frequency converter 11 on FIG. 1, and in which the chrominance component is converted to a frequency band lower than that of the frequency modulated luminance component $Y_{FM}$ supplied to mixing circuit 65. The resulting frequency converted chrominance component $S_j$ is supplied from frequency converter 11' through a low pass filter 68 and a recording amplifier 69 to another input of mixing circuit 65 so as to be combined in the latter with the frequency modulated luminance $Y_{FM}$ for providing a composite signal S which, in the recording state or mode of the apparatus, is supplied through record contacts R of a record-playback switch $SW'_1$ to rotary magnetic recording and reproducing heads $H_A$ and $H_B$.

As previously mentioned, the apparatus schematically illustrated on FIG. 7 is intended to represent a helical scan-type video tape recording and reproducing apparatus in which rotary heads $H_A$ and $H_B$ are substantially diametrically opposed and suitably driven, as by a motor (not shown), to alternately scan oblique tracks extending across a tape T as the latter is moved longitudinally, as by a motor-driven capstan (not shown), in a path that extends helically about a portion of the periphery of a guide drum (not shown) associated with the rotary heads. A suitable conventional servo system (not shown) may be provided for regulating the rotary movements of heads $H_A$ and $H_B$ so that the heads commence to move along respective tracks on tape T at the commencement of alternating field intervals of the color video signal being applied to input terminal 55 for recording on the tape.

The gain controlled luminance component from circuit 57 is further shown to be applied through a record contact R of a record-playback switch $SW_6$ to a horizontal synchronizing signal separator 70 which separates the horizontal synchronizing signals $P_H$ therefrom for application, as the sampling signals, to sample and hold circuit 19. The separated horizontal synchronizing signals $P_H$ are also applied to a flip-flop 71 which provides rectangular waveform or control signal $S_H$ having alternating high and low intervals each with a duration of one line interval of the video signal, and such control signal $S_H$ is applied to one input of an OR circuit 72. Another input of OR circuit 72 is connected to a flip-flop 73 to receive therefrom a rectangular waveform or signal $S_V$ having alternating high and low intervals each with a duration equal to one field interval of the video signal being recorded so that, for example, the control signal $S_V$ is at a high level during the scanning of each track on the tape T by the head $H_A$ and the control signal $S_V$ is at a low level during the scanning of each track on the tape T by the head $H_B$. In order to provide the described rectangular waveform or control signal $S_V$, flip-flop 73 may be controlled by pulse generators $PG_1$ and $PG_2$ which are suitably associated with a shaft (not shown) for rotating heads $H_A$ and $H_B$ so as to indicate the rotational positions of the latter. For example, pulse generator $PG_1$ may provide a pulse for setting flip-flop 73 at the commencement of each scanning movement of head $H_A$ across tape T, while pulse generator $PG_2$ provides a pulse for resetting flip-flop 73 at the commencement of each scanning movement of head $H_B$ across the tape.

As a result of the described rectangular waveforms $S_H$ and $S_V$ applied to OR circuit 72, an output or control signal $S_X$ is obtained from circuit 72 which remains high for the entire duration of each field interval recorded by head $H_A$ in a respective track on tape T, and which goes high only during alternate line intervals of each field interval recorded by head $H_B$ in a next adjacent track. In the apparatus illustrated on FIG. 7, such output or control signal $S_X$ from OR circuit 72 is employed for controlling the establishment of different carriers for the frequency converted chrominance component $S_j$ to be recorded in tracks that are next adjacent to each other, with such carriers differing from each other in their polarity characteristics as described in detail in U.S. Pat. Nos. 3,925,910, 4,007,482, and 4,007,484, each of which has a common assignee herewith.

It will also be seen that the apparatus of FIG. 7 includes a circuit according to this invention for processing the chrominance component which is of the type previously described with reference to FIG. 1 and which is also generally identified by the reference 10. Such circuit 10 has its several components identified by the same reference numerals that were used in describing the corresponding components on FIG. 1.

More particularly, in the case where the chrominance component is to be converted in frequency converter 11' from a standard color subcarrier frequency $f_S$ of 3.58 MHz to a relatively low color subcarrier frequency $f_c$ of 688 KHz, that is, $f_c = (44 - \frac{1}{4})f_H$, the circuit 10 for providing the necessary frequency converting signal includes a variable frequency or voltage controlled oscillator 12 generating a signal with a center frequency of $175f_H$. Such oscillating signal with a center frequency of $175f_H$ is applied to a frequency divider 13 which frequency divides by four so as to provide an output signal with the frequency $(44 - \frac{1}{4})f_H$. Such output signal from frequency divider 13 is applied to a frequency converter 14 which also receives a reference oscillating signal having the standard color subcarrier frequency $f_S = 3.58$ MHz from a fixed frequency or reference oscillator 15, with the result that frequency converter 14 provides a frequency converting signal $S_q$ having the frequency $f_S + (44 - \frac{1}{4})f_H$.

In the apparatus of FIG. 7, the output of frequency converter 14 is applied without change, as indicated at $+S_q$, to one input of a switching circuit 74, and the output of converter 14 is also applied to an inverting circuit 75 so as to obtain a frequency converting signal $-S_q$ of opposite phase or polarity to the frequency converting signal $+S_q$ and which is applied to another input of switching circuit 74. Switching circuit 74 is effective to alternately apply the frequency converting signals $+S_q$ and $-S_q$ to frequency converter 11', and switching circuit 74 is controlled by control signal $S_x$ from OR circuit 72 so that frequency converting signal $+S_q$ is applied to converter 11' whenever control signal $S_x$ has a high value, and frequency converting signal $-S_q$ is applied to converter 11' whenever control signal $S_x$ has a low value. Frequency converting signals $+S_q$ and $-S_q$ alternately applied to frequency converter 11' are effective in the latter to convert the carrier of the chrominance component from its original carrier frequency $f_s$ to a relatively lower carrier frequency of $(44 - \frac{1}{4})f_H$. As a result of the foregoing, the frequency converted chrominance component $S_j$ applied from frequency converter 11' through filter 68 and amplifier 69 to mixing or adding circuit 65 has a frequency band lower than that of the frequency modulated luminance component $Y_{FM}$. During intervals when the frequency converting signal $-S_q$ is applied to frequency converter 11', the polarity or phase of the carrier of the frequency converted chrominance component $S_j$ is reversed as compared with the phase or polarity of such carrier during the intervals when the frequency converting signal $+S_q$ is applied to frequency converter 11'.

It will also be noted that the carrier frequency $f_c$ of the frequency converted chrominance component $S_j$ satisfies the equation $f_c = \frac{1}{4}f_H(2m - 1)$ in which m is a whole positive integer. Of course, in the present example in which $f_c = (44 - \frac{1}{4})f_H$, the value m in the above equation is 88.

As a result of the described selection of the carrier frequency of the frequency converted chrominance component $S_j$, the second harmonic of the carrier of the frequency converted chrominance component is interleaved with the luminance component so as to avoid beat interference therebetween. By avoiding such beat interference, the frequency converted chrominance component can be recorded with a relatively high amplitude in respect to the amplitude of the frequency modulated luminance component for obtaining a good signal-to-noise (S/N) ratio of the chrominance component, as described in detail in U.S. Pat. No. 3,730,983, having a common assignee herewith. When the frequency converted chrominance component $S_j$ and the frequency modulated luminance component $Y_{FM}$ are combined in mixing circuit 65 to provide the combined or composite signal S for recording by heads $H_A$ and $H_B$ in successive parallel tracks on tape T, the frequency converted chrominance component may amplitude modulate the frequency modulated luminance component.

Continuing with the description of processing circuit 10 on FIG. 7, it will be seen that, as previously described in connection with FIG. 1, the oscillating signal from voltage controlled oscillator 12 is further applied to a contact R of a record-playback switch $SW_4$ for transmission through the latter, during recording, to a frequency divider 16 in which the received signal has its frequency divided by five. The output of frequency divider 16 is supplied to a frequency divider 17 in which the received signal is further divided by seven, and the output of frequency divider 17 is applied to a contact R of a record-playback switch $SW_5$ for transmission through the latter during recording to a saw-tooth waveshaper 18. As a result of the successive divisions of the output of voltage controlled oscillator 12 in frequency dividers 16 and 17, the saw-tooth wave or signal $S_R$ (FIG. 2) issuing from waveshaper 18 during recording has a center frequency of $5f_H$. Such saw-tooth wave or signal $S_R$ is applied to a sample and hold circuit 19 for sampling in the latter by the horizontal synchronizing signals $P_H$ having the frequency $f_H$ and which are separated from the luminance component of the color video signal being recorded by means of the separator 70. The sampled level of the saw-tooth wave or signal $S_R$ is applied from circuit 19 to a contact R of a record-playback switch $SW_3$ for transmission through the latter, during recording, as a control signal for voltage controlled oscillator 12. Thus, during recording, as previously described with reference to FIG. 1, voltage controlled oscillator 12, frequency dividers 16 and 17, waveshaper 18 and sample and hold circuit 19 form an automatic frequency control circuit (AFC) by which the oscillating signal from oscillator 12 is synchronized with the horizontal synchornizing signals $P_H$ of the color video signal being recorded and is maintained at a frequency of $175f_H$.

The record-playback switches $SW'_1$ and $SW_3$–$SW_6$ are preferably ganged or interconnected so as to be simultaneously changed-over from their recording positions, in which the movable contacts of the enumerated switches engage repective recording contacts R, to their reproducing or playback positions shown on FIG. 7, and in which the movable contacts engage respective playback contacts P. In the reproducing mode of operation of the apparatus shown on FIG. 7, the signals alternately reproduced by heads $H_A$ and $H_B$ from the successive tracks on tape T are transmitted by way of playback contacts P of switch $SW'_1$ to playback amplifiers $76_A$ and $76_B$, respectively. The outputs of playback amplifiers $76_A$ and $76_B$ are alternatively applied through switching circuits $77_A$ and $77_B$, respectively, to an adding or combining circuit 78, and the switching circuits $77_A$ and $77_B$ are oppositely controlled by the rectangular waveform or signal $S_V$ from flip-flop 73. More particularly, switching circuits $77_A$ and $77_B$ are closed and opened, respectively, as shown on FIG. 7, only during each field interval when signal $S_V$ is at a high level, while switching circuit $77_B$ is closed and switching circuit $77_A$ is opened only during each field interval when signal $S_V$ is at a low level. Thus, the field intervals of the signals alternately reproduced by heads $H_A$ and $H_B$ are transmitted in sequence from the output of mixing circuit 78 to both a high pass filter 79 and a low pass filter 80. The filters 79 and 80 respectively separate the frequency modulated luminance component $Y_{FM}$ and the frequency converted chrominance component $S_j$ from the reproduced signals. The frequency modulated luminance component $Y_{FM}$ separated from the reproduced signals is passed through a limiter 81 to a frequency demodulator 82 so as to obtain a demodulated luminance component. The demodulated luminance component is then passed through a low pass filter 83 and a de-emphasis circuit 84 which has a characteristic substantially complementary to that of the pre-emphasis circuit 60. The resulting de-emphasized luminance component is then applied to an adding or mixing circuit 85.

The frequency converted chrominance component $S_j$ separated from the reproduced signals by filter 80 is applied through an automatic color control circuit 86 to a frequency reconverter 11' which alternately receives the frequency converting signals $+S_q$ and $-S_q$ from switching circuit 74, and by which the carrier of the reproduced chrominance component $S_j$ is reconverted from its low frequency $f_c$ to the original carrier frequency $f_S$. The resulting frequency reconverted chrominance component is passed successively through a band pass filter 87 and then a comb filter 88 in which, as hereinafter described in detail, chrominance components of cross-talk signals are cancelled or suppressed so that only the chrominance component of the video signal being reproduced from a particular track by the head $H_A$ or $H_B$, respectively, is passed to mixing circuit 85 for combining in the latter with the demodulated luminance component and thereby forming the desired reproduced color video signal applied to an output terminal 89.

The output of comb filter 88 is also shown to be supplied to the burst gate 20 of processing circuit 10 which extracts burst signals from the reconverted chrominance component and applies the extracted burst signals to one input of a phase comparator 21 which, at its other input, receives the reference oscillating signal with the standard color subcarrier frequency $f_s$ from reference oscillator 15. The DC voltage output of phase comparator 21 determined by a phase comparison of the extracted burst signals with the reference oscillating signal from oscillator 15 is applied through an adding circuit 22 to contact P of switch $SW_3$ for transmission through the latter, in the reproducing or playback mode of operation, to the voltage controlled oscillator 12. It will be apparent that, in the playback or reproducing mode of operation, any phase difference between burst signals extracted by gate 20 from the reconverted chrominance component and the output of reference oscillator 15 causes comparator 21 to apply a suitable DC voltage to voltage controlled oscillator 12 for effecting a required change in the phase of the frequency converting signals $+S_q$ and $-S_q$, whereby to achieve an automatic phase control function for eliminating so-called jitter from a picture or image reproduced by a color cathode ray tube in response to color video signals obtained at output terminal 89.

In the playback or reproducing mode of operation of the apparatus shown on FIG. 7, control signal $S_x$ for operating switching circuit 74 is again obtained from OR circuit 72 in response to the rectangular waveforms or control signals $S_H$ and $S_V$ from flip-flops 71 and 73, respectively. As before, flip-flop 73 is alternately set and reset by pulses from pulse generators $PG_1$ and $PG_2$, respectively, in synchronism with the rotational positioning of heads $H_A$ and $H_B$, respectively. However, in the playback mode of operation, the reproduced color video signals from mixing circuit 85 are applied through contact P of switch $SW_6$ to separator 70 so that the sampling by sample and hold circuit 19 and the triggering of flip-flop 71 occur in response to the horizontal synchronizing signals $P_H$ separated from the reproduced color video signals.

As previously described in connection with the recording mode of operation, in the playback mode of operation the oscillating signal from voltage controlled oscillator 12 is frequency-divided in divider 13 and then frequency converted with the reference oscillating signal from reference oscillator 15 to form the frequency converting signal having the frequency $f_s+(44-\frac{1}{4})f_H$ and which is supplied to frequency reconverter 11''. Thus, during playback or reproducing, the frequency reconverter 11'', frequency converter 14, oscillators 12 and 15 and phase comparator 21 form an automatic phase control circuit (APC) by which small time base errors, such as, phase errors, included in the reproduced chrominance component are cancelled or eliminated from the reconverted chrominance component.

Figure 6:
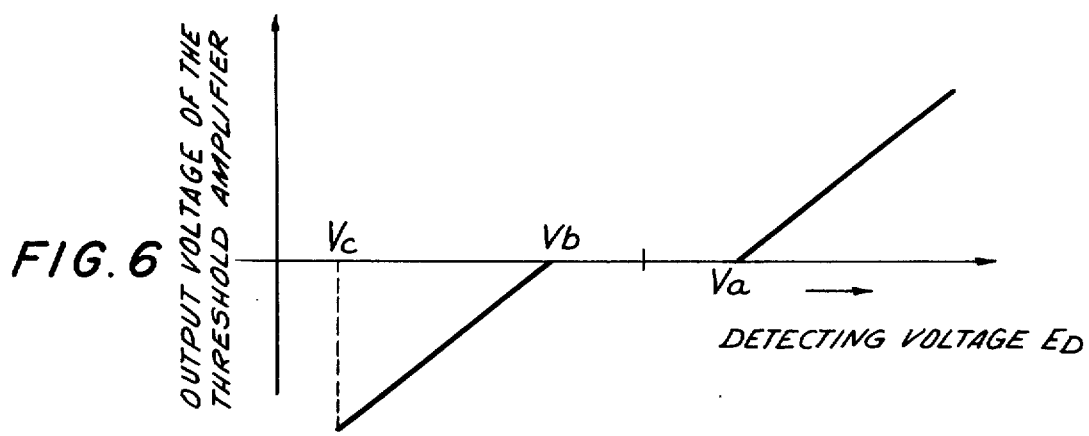
FIG. 6 is a graphic representation of the output voltage characteristic of the threshold amplifier shown on FIG. 4.

As previously described with reference to FIG. 1, the output of frequency divider 13 on FIG. 7 is also applied to contact P of switch $SW_4$, and a frequency divider 23 operative to divide by four is connected between the output of frequency divider 16 and contact P of switch $SW_5$. Thus, in the playback or reproducing mode of operation of the apparatus shown on FIG. 7, the oscillating signal produced by voltage controlled oscillator 12 with the center frequency $175f_H$ is divided by eighty by the successive dividing actions of frequency dividers 13, 16 and 23, with the result that the saw-tooth wave or signal $S_P$ (FIG. 3) applied from waveshaper 18 to sample and hold circuit 19 has a center frequency of $175/80f_H$. Such saw-tooth signal $S_P$ is sampled in circuit 19 by the horizontal synchronizing signals $P_H$ obtained by separator 70 from the reproduced color video signals. As previously described with reference to FIG. 1, the signal sampled by circuit 19 has a frequency which is nominally $3/16f_H$ and which corresponds to the beat frequency between the signal applied to waveshaper 18 through frequency dividers 13, 16 and 23 and the horizontal synchronizing signals $P_H$. The sampled signal from circuit 19 is applied to a frequency detector 24 which, as before, discriminates the frequency $3/16f_H$ of the sampled signal so as to generate a detecting voltage $E_D$ varying with the frequency difference between the actual or detected frequency of the sampled signal and the predetermined center frequency $3/16f_H$. Such detecting voltage $E_D$ from detector 24 is applied, as before, to a threshold amplifier 25 which is made to apply a corresponding DC output to adder 22 only when the detecting voltage $E_D$ is outside of the predetermined range $V_a$-$V_b$ (FIG. 6). As previously described with reference to FIG. 6, the DC voltage applied by threshold amplifier 25 to adder 22 is of positive polarity and increases progressively with the detecting voltage $E_D$ when the latter is greater than the voltage $V_a$, whereas the DC voltage applied by threshold amplifier 25 to adder 22 is of negative polarity and increases in proportion to the amount by which the detecting voltage $E_D$ is lower than the reference voltage $V_b$. Once again, the range of detecting voltage $E_D$ for which threshold amplifier 25 is cored or provides a zero output is determined in respect to the operation of the automatic phase control circuit (APC), that is, threshold amplifier 25 provides a zero output to adder 22 only so long as voltage controlled oscillator 12 can be locked-in by the DC voltage signal from a phase comparator 21. On the other hand, when the detected time base error exceeds the lock-in range of the automatic phase control circuit (APC), the detecting voltage $E_D$ from frequency detector 24 is outside the range $V_a$-$V_b$ and, accordingly, a DC voltage output is applied from amplifier 25 through adder 22 to voltage controlled oscillator 12, with the amplitude of such DC voltage being proportional to the detecting voltage $E_D$, and with the polarity of the DC voltage from amplifier 25 being dependent on the direction of the lock-out of the automatic phase control circuit. Thus, during reproducing or playback operation of the apparatus shown on FIG. 7, adder 22 applies only the output voltage of phase comparator 21 to voltage controlled oscillator 12 so long as the detected time base errors are within the lock-in range of the automatic phase control circuit (APC). However, upon lock-out of the automatic phase control circuit, that is, as soon as the time base error in the reproduced chrominance component exceeds the lock-in range of the automatic phase control circuit, the automatic frequency control circuit (AFC) becomes operative to apply a suitable DC control voltage from threshold amplifier 25 through adder 22 to voltage controlled oscillator 12 for immediately adjusting the frequency of the oscillating signal from oscillator 12 in the sense for returning to the lock-in range or condition of the automatic phase control circuit.

Returning to the recording operation of the apparatus shown on FIG. 7, it is further to be noted that the alternative application to frequency converter 11' of frequency converting signals $+S_q$ and $-S_q$ of opposed phase or polarity is effective in converter 11' to provide the resulting frequency converted chrominance component $S_j$ with respective carriers $C_a$ and $-C_a$ which are similarly of opposed phase or polarity. By reason of the previously described configuration of control signal $S_x$ for switching circuit 74, during each field interval recorded by head $H_A$, converting signal $+S_q$ is continuously applied to frequency converter 11' with the result that the successive intervals of each field interval recorded by head $H_A$ in a respective track are provided with a carrier $C_a$ of the same polarity. On the other hand, during successive line intervals of each field interval recorded by head $H_B$ in a respective track, frequency converting signals $+S_q$ and $-S_q$ are alternately applied to frequency converter 11' so that the successive line intervals of each field interval recorded by head $H_B$ are alternately recorded with the carriers $C_a$ and $-C_a$ of opposed polarity.

As is well known, the interfering signal due to crosstalk in respect to the luminance component of the color video signal may be eliminated, at least in part, by providing heads $H_A$ and $H_B$ with air gaps having different azimuth angles. Further, as is well known, a suitable servo system may be provided for controlling rotation of heads $H_A$ and $H_B$ so that the control signal $S_x$ which controls switching circuit 74 has the same relationship to the operative positioning of heads $H_A$ and $H_B$ during reproducing as it has during recording.

Considering the frequency converted chrominance component of the recorded color video signal, it should be noted that the effect of providing the same with carriers $C_a$, $-C_a$ of reversed phase or polarity in successive line intervals or areas of each track recorded by head $H_B$ is the same as providing such frequency converted chrominance component with a new carrier $C_b$ having frequency components offset by $\frac{1}{2}f_H$, or interleaving with respect to the frequency components of the carrier $C_a$ with which the frequency converted chrominance component is recorded in the next adjacent track by head $H_A$, as described in detail in U.S. Pat. No. 3,925,801. Accordingly, in the reproducing operation of the apparatus shown on FIG. 7, when, for example, head $H_A$ scans a track on tape T for reproducing the frequency converted chrominance component recorded therein with the carrier $C_a$, the undesired or cross-talk signal simultaneously reproduced by head $H_A$ from a next adjacent track originally recorded by the head $H_B$ has its frequency converted chrominance component provided with a carrier $C_b$ in frequency interleaving relation to the carrier $C_a$.

As previously noted, during the reproducing operation of the apparatus on FIG. 7, switching circuit 74 is again controlled by control signal $S_x$ from OR circuit 72 so that frequency converter 11" continuously receives frequency converting signal $+S_q$ during the scanning of a track by head $H_A$, and frequency converting signals $+S_q$ and $-S_q$ are alternately applied to frequency reconverter 11" for successive line intervals during the scanning of a track by head $H_B$. As a result of the foregoing, during the scanning of a track by head $H_A$, frequency reconverter 11" reconverts the carrier $C_a$ of the chrominance component then being reproduced to a carrier having the original or standard carrier frequency $f_s$, while the carrier $C_b$ of the cross-talk chrominance component has its frequency similarly shifted so as to be spaced midway between the principal sidebands of the desired carrier. Similarly, during the scanning of a track by head $H_B$, frequency reconverter 11" frequency converts the carrier $C_b$ of the chrominance component being reproduced from such track to a carrier also having the original or standard frequency $f_s$, while the carrier $C_a$ of the cross-talk chrominance component then being reproduced has its frequency shifted so as to be spaced midway between the principal sidebands of the desired reconverted carrier. Thus, the reconverted carriers of the chrominance component reproduced during alternate field intervals both have the same carrier frequency $f_s$, while the chrominance component of the undesired or cross-talk signal is, in each case, spaced midway between the principal sidebands of the desired carrier so as to be eliminated by comb filter 88 and thereby yield the desired reconverted chrominance component free of any cross-talk chrominance component.

Figure 8:
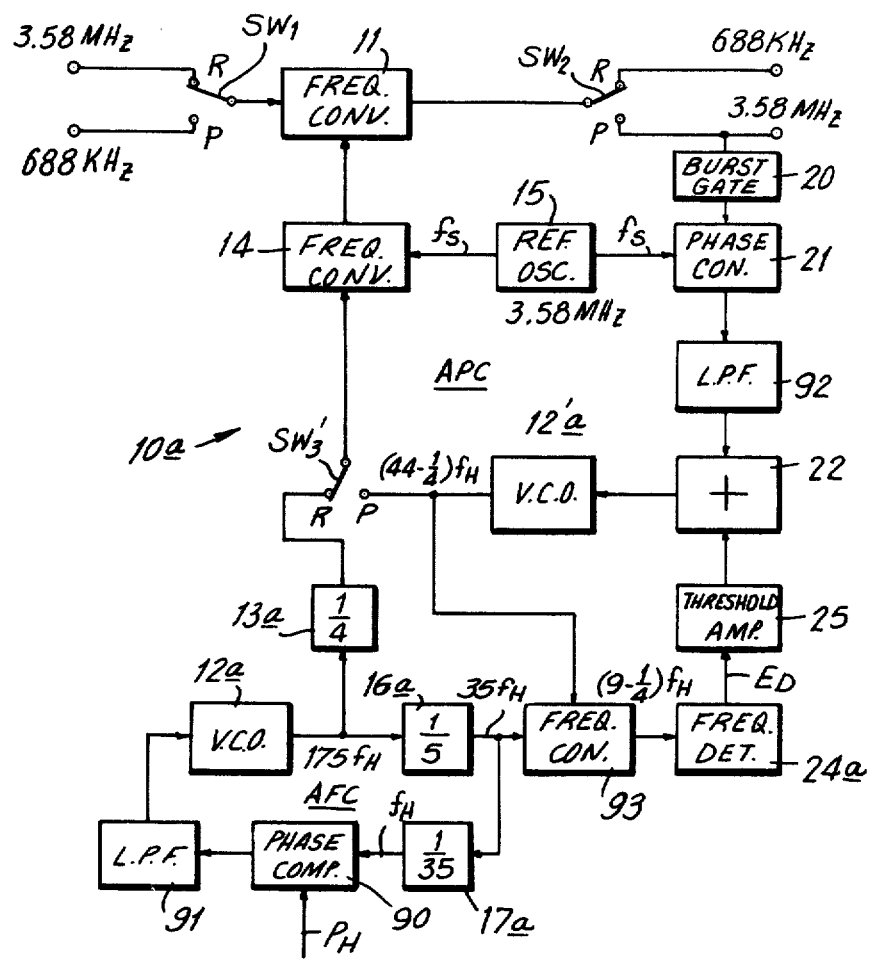
FIGS. 8, 9, 10, 11 and 12 are block diagrams similar to FIG. 1, but showing respective chrominance component processing circuits according to other embodiments of the present invention.

Referring now to FIG. 8, it will be seen that, in a circuit 10a according to another embodiment of this invention for processing the chrominance component of a color video signal during the recording and reproducing of the latter, those components of the circuit 10a which correspond to components previously descirbed with reference to FIG. 1 are identified by the same reference numerals. Thus, in the recording operation of processing circuit 10a, the chrominance component of an NTSC color video signal is applied to contact R of switch $SW_1$ for transmission through the latter to a frequency converter 11 in which the chrominance component is frequency converted to a relatively low color subcarrier frequency, for example, from the standard color subcarrier frequency of 3.58 MHz to 688 KHz. The resulting frequency converted chrominance component issuing from converter 11 is obtained at contact R of switch $SW_2$ and has its frequency band shifted below the frequency band of a frequency modulated luminance component, whereupon, the frequency modulated luminance component and frequency converted chrominance component may be combined to provide a composite video signal recorded in successive parallel oblique tracks on a magnetic tape, as previously described with reference to FIG. 7.

The frequency conversion of the chrominance component from its standard color subcarrier frequency $f_s$ of 3.58 MHz to the relatively low color subcarrier frequency of 688 KHz, that is, $(44-\frac{1}{2})f_H$, is achieved in frequency converter 11 by applying to the latter a frequency converting signal having the frequency $f_s+(44-\frac{1}{2})f_H$. In order to obtain such frequency converting signal during recording, the processing circuit 10a is shown to include a variable frequency or voltage controlled oscillator 12a which generates an oscillating signal having a center frequency of $175f_H$. The oscillating signal with a center frequency of $175f_H$ is applied to a frequency divider 13a by which the output of oscillator 12a has its frequency divided by four so as to provide an output signal having the frequency $(44-\frac{1}{2})f_H$. Such output from frequency divider 13a is applied to a contact R of a record-playback switch $SW'_3$ so as to be transmitted through the latter, during recording, to a frequency converter 14 which also receives a reference oscillating signal with the standard color subcarrier frequency $f_S=3.58$ MHz from a fixed frequency or reference oscillator 15. Thus, frequency converter 14 provides frequency converter 11 with the desired frequency converting signal having the frequency $f_S+(44-\frac{1}{2})f_H$.

The oscillating signal from voltage controlled oscillator 12a is also applied to a frequency divider 16a in which the received signal has its frequency divided by five. The output of frequency divider 16a having a center frequency of $35f_H$ is applied to another frequency divider 17a in which the received signal further has its frequency divided by thirty-five. Thus, the output of frequency divider 17a has a nominal or center frequency of $f_H$ and is applied to a phase comparator 90 which also receives horizontal synchronizing signals $P_H$ suitably separated from the color video signal to be recorded. It will be apparent that comparator 90 compares the output of frequency divider 17a with the horizontal synchronizing signals and, in the event of deviation therebetween, provides a suitable DC voltage output or error signal through a low pass filter 91 to voltage controlled oscillator 12a so as to maintain the output of the latter at the frequency $175f_H$ and in synchronism with the horizontal synchronizing signals $P_H$ from the color video signal being recorded. Thus, voltage controlled oscillator 12a, frequency dividers 16a and 17a, phase comparator 90 and low pass filter 91 form an automatic frequency control circuit (AFC) operative during recording, and by which the oscillating signal from oscillator 12a, and hence the converting signal applied to frequency converter 11, are synchronized with the horizontal synchronizing signals of the color video signal being recorded.

For reproducing operation of processing circuit 10a, switches $SW_1$, $SW_2$ and $SW'_3$ are changed-over to engage their respective reproducing or playback contacts P. In such case, the reproduced chrominance component separated from the reproduced composite video signal and having a color subcarrier frequency of 688 KHz is applied through switch $SW_1$ to frequency converter 11 to be reconverted in the latter to the original or standard color subcarrier frequency of 3.58 MHz, whereupon the frequency reconverted chrominance component obtained at contact P of switch $SW_2$ may be recombined with the reproduced luminance component, after frequency demodulation of the latter, to provide a reproduced standard color video signal, as described with reference to FIG. 7. The frequency reconverted chrominance component is also shown to be applied from contact P of switch $SW_2$ to a burst gate 20 which extracts the color burst signal from the reconverted chrominance component and applies the extracted burst signal to a phase comparator 21 for comparison, in the latter, with the reference oscillating signal from oscillator 15. Once again, phase comparator 21 provides a DC voltage or phase error signal at a level corresponding to any detected phase difference between the extracted burst signal and the reference oscillating signal, and such DC voltage from comparator 21 is applied through a low pass filter 92 to an adder 22 having its output connected to a voltage controlled oscillator 12'a. The oscillator 12'a provides an oscillating output signal with a center frequency of $(44-\frac{1}{4})f_H$ and is controlled by the output voltage of adder circuit 22. The oscillating signal from voltage controlled oscillator 12'a is applied to contact P of switch $SW'_3$ and also to a frequency converter 93 which further receives the oscillating output signal of frequency divider 16a. Due to the center frequency $(44-\frac{1}{4})f_H$ of the oscillating output of oscillator 12'a and the center frequency $35f_H$ of the oscillating signal from frequency divider 16a, the output of frequency converter 93 has a center frequency of $(9-\frac{1}{4})f_H$ and is applied to a frequency detector 24a which discriminates such center frequency. More particularly, frequency detector 24a may be generally similar to the previously described frequency detector 24 in that it provides a detecting voltage $E_D$ varying with the frequency difference between the actual or detected frequency of the output of frequency converter 93 and the center frequency $(9-\frac{1}{4})f_H$ of such output. Such detecting voltage $E_D$ from detector 24a may increase and decrease relative to a predetermined value thereof as the actual output frequency of converter 93 shifts increasingly below and above, respectively, the center frequency $(9-\frac{1}{4})f_H$. As before, the detecting voltage $E_D$ from frequency detector 24a is applied to a threshold amplifier 25 which includes a coring circuit so that the output signal from amplifier 25 to adder 22 is zero so long as the detecting voltage $E_D$ is within the range $V_a-V_b$, and further so that the output of amplifier 25 increases progressively with increasing values of detecting voltage $E_D$ above the reference voltage $V_a$, while the output of amplifier 25 is of negative polarity and increases progressively for values of the detecting voltage $E_D$ increasingly below the reference voltage $V_b$.

In the reproducing mode of operation of circuit 10a, frequency converters 11 and 14, oscillators 12'a and 15 and phase comparator 21 form an automatic phase control circuit (APC) for the frequency reconverting signal applied to frequency converter 11, and by which small time base errors, such as, phase errors included in the reproduced chrominance component, are cancelled or eliminated from the reconverted chrominance component. As in the case of the circuit described with reference to FIG. 1, the range of the detecting voltage $E_D$ from frequency detector 24a for which threshold amplifier 25 provides a zero output is determined in respect to the lock-in range of the automatic phase control circuit (APC), that is, threshold amplifier 25 provides a zero output to adder 22 only so long as the voltage controlled oscillator 12'a can be locked-in by the DC voltage signal from phase comparator 21.

Further, in the reproducing mode of operation of circuit 10a, voltage controlled oscillator 12a, frequency dividers 16a and 17a and phase comparator 90 form an automatic frequency control circuit (AFC) which controls the frequency of the output of frequency converter 93 in accordance with the frequency of the horizontal synchronizing signals $P_H$ applied to phase comparator 90. Thus, upon lock-out of the automatic phase control circuit, that is, when the time base error in the reproduced chrominance component exceeds the lock-in range of the automatic phase control circuit (APC), the automatic frequency control circuit (AFC) provides a respective frequency error signal which threshold amplifier 25 is operative to pass through adder 22 to voltage controlled oscillator 12'a for immediately adjusting the frequency of the oscillating signal from the latter in the sense for returning the carrier of the frequency reconverted chrominance component to the lock-in range or condition of the automatic phase control circuit (APC).

Figure 9:
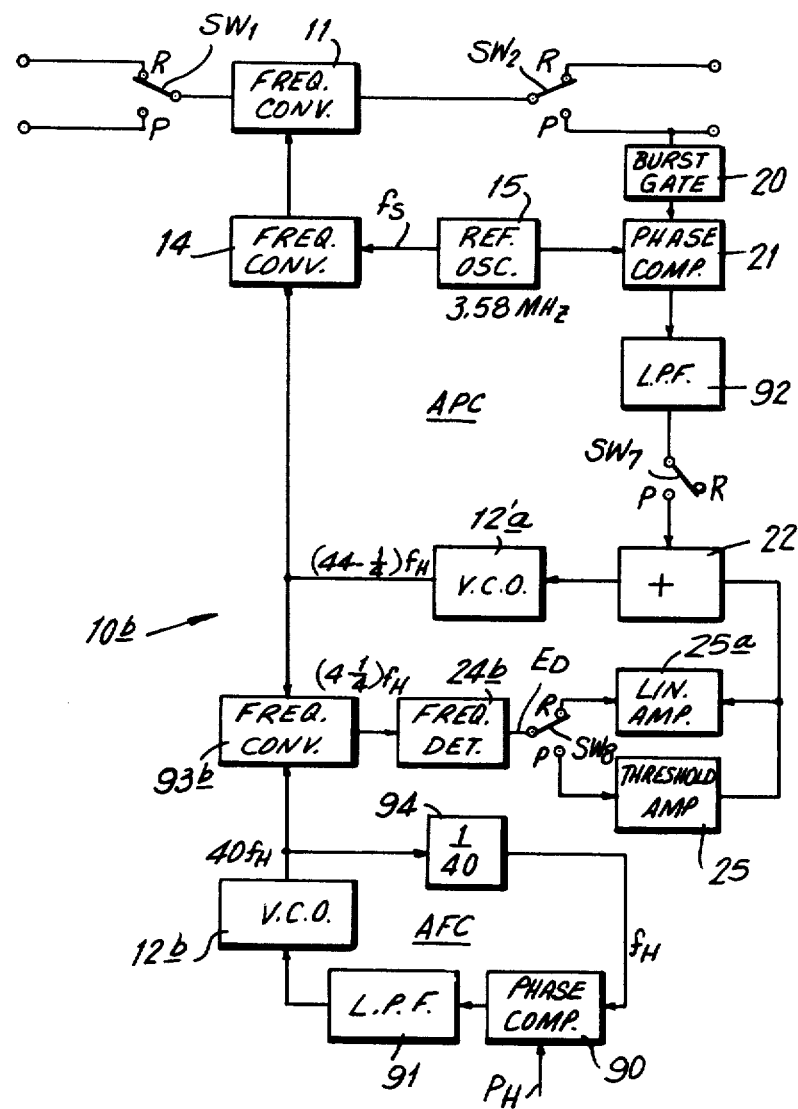

Referring now to FIG. 9 in which a signal processing circuit 10b according to another embodiment of this invention is schematically illustrated, it will be seen that the components of such circuit 10b which correspond to components previously described with reference to FIG. 1 or FIG. 8 are identified by the same reference numerals. More particularly, in circuit 10b, the oscillating output of voltage controlled oscillator 12'a having a center frequency of $(44-\frac{1}{4})f_H$ is applied directly to frequency converter 14, and a switch $SW_7$ is interposed between low pass filter 92 and adder 22 so as to render the automatic phase control circuit (APC) inoperative except when switch $SW_7$ is closed in the reproducing mode of operation. Further, in circuit 10b, a frequency converter 93b receives the oscillating signal from voltage controlled oscillator 12'a and an oscillating signal having a center frequency of $40f_H$ and which is generated by a voltage controlled oscillator 12b. Thus, the output of frequency converter 93b has a center frequency of $(4-\frac{1}{4})f_H$ so as to be more readily detected or discriminated by a frequency detector 24b than is the relatively higher frequency output $(9-\frac{1}{4})f_H$ of frequency converter 93 in circuit 10a. The detecting voltage or error signal $E_D$ from frequency detector 24b is applied through a switch $SW_8$ to a linear amplifier 25a, in the recording mode of operation of circuit 10b, or to a threshold amplifier 25 in the playback or reproducing mode of operation, and the outputs of amplifiers 25 and 25a are both connected to adder 22.

The automatic frequency control circuit (AFC) of signal processing circuit 10b is shown to include a frequency divider 94 which divides the output of voltage controlled oscillator 12b by forty, and thereby provides an oscillating output with a center frequency of $f_H$ which is applied to phase comparator 90 for comparison in the latter with the horizontal synchronizing signals $P_H$ so as to provide a corresponding DC control voltage applied through low pass filter 91 to voltage controlled oscillator 12b. Thus, during recording and reproducing operations of circuit 10b, the oscillating output of voltage controlled oscillator 12b having a center frequency of $40f_H$ is synchronized with the frequency of the horizontal synchronizing signals. During recording, frequency detector 24b detects variations in the frequency of the output from frequency converter 93b in respect to the center frequency $(4-\frac{1}{4})f_H$ to provide a corresponding detecting voltage or frequency error signal $E_D$ which is applied through switch SW$_8$ and amplifier 25a to adder 22 for correspondingly controlling voltage controlled oscillator 12'a. During reproducing or playback operation of circuit 10b, switch SW$_7$ is closed to apply phase error signal from comparator 21 through adder 22 to oscillator 12'a so that automatic phase control circuit (APC) is operative for removing time base errors from the reconverted chrominance component by controlling the frequency reconverting signal applied to frequency converter 11 so long as such time base errors are within the lock-in range of the automatic phase control circuit. When the detected time base errors are within the lock-in range of the automatic phase control circuit, the resulting detecting voltage $E_D$ from frequency detector 24b is within the corresponding coring range of threshold amplifier 25 so that there is no output from the latter to adder 22 and the automatic frequency control circuit (AFC) is not operative to control the voltage controlled oscillator 12'a. However, upon lock-out of the automatic phase control circuit, the detecting voltage or frequency error signal $E_D$ from frequency detector 24b is outside the range within which threshold amplifier 25 provides a zero output voltage and, accordingly, a suitable DC output voltage is applied from amplifier 25 through adder 22 to voltage controlled oscillator 12'a for suitably varying the output frequency of the latter and of frequency converter 14 and thereby returning the frequency reconverted chrominance component to within the lock-in range or condition of the automatic phase control circuit (APC).

Figure 10:
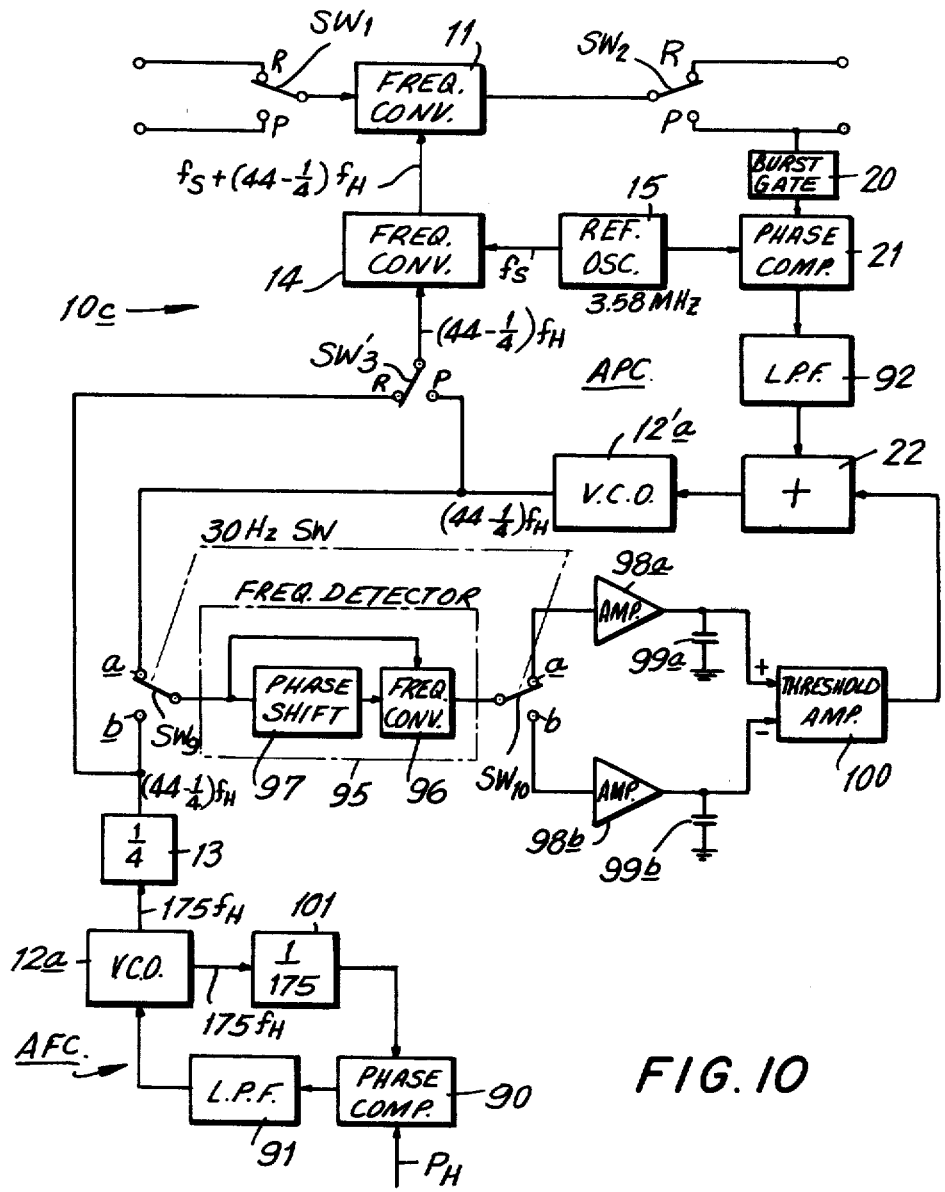

Referring now to FIG. 10, it will be seen that, in another signal processing circuit 10c according to this invention, the components thereof corresponding to components of the previously described embodiments are again identified by the same reference numerals. More particularly, in the recording mode of operation of circuit 10c, frequency converter 14 receives the reference oscillation signal with the frequency $f_S$ from reference oscillator 15 and further receives an oscillating signal with the center frequency $(44-\frac{1}{4})f_H$ through the R contact of a switch SW'$_3$ from an automatic frequency control circuit (AFC). In signal processing circuit 10c, the automatic frequency control circuit (AFC) is shown to include a voltage controlled oscillator 12a providing an oscillation output with a center frequency of $175f_H$ which is divided by four in a frequency divider 13 to provide the desired signal with a center frequency of $(44-\frac{1}{4})f_H$. The oscillation output of voltage controlled oscillator 12a is further applied to a frequency divider 101 in which it is divided by one hundred and seventy-five to provide an oscillation output with a center frequency of $f_H$ which is compared in a phase comparator 90 with the horizontal synchronizing signals $P_H$. The resulting output of comparator 90 is applied through low pass filter 91 for controlling voltage controlled oscillator 12a. It will be apparent from the foregoing that, in the recording mode of circuit 10c, the frequency converting signal applied to frequency converter 11 for down-converting the chrominance component from its standard color subcarrier frequency to the relatively low subcarrier frequency of 688 KHz is synchronized with the horizontal synchronizing signals separated from the color video signal to be recorded.

In the playback or reproducing mode of operation of circuit 10c, burst signals are separated from the frequency reconverted chrominance component by burst gate 20 and compared, in phase comparator 21, with the oscillating signal from reference oscillator 15 to provide a DC voltage or phase error signal through low pass filter 92 and adder 22 for controlling a voltage controlled oscillator 12'a having a center frequency of $(44-\frac{1}{4})f_H$. Such oscillating signal from voltage controlled oscillator 12'a is applied, in the reproducing or playback mode, through contact P of switch SW'$_3$ to frequency converter 14 which further receives the oscillation signal from reference oscillator 15 for providing therefrom the desired frequency reconverting signal.

The oscillation signals from voltage controlled oscillator 12'a and from oscillator 12a by way of frequency divider 13, which both have nominal or center frequencies of $(44-\frac{1}{4})f_H$, are applied to contacts a and b, respectively, of a switching circuit SW$_9$ so as to be alternatively applied through the latter to a frequency detector 95. As schematically indicated, the frequency detector 95 may generally comprise a frequency converter 96 which receives the input to frequency detector 95 both directly and through a suitable phase shifter or delay 97 so that the output of frequency converter 96 will be a detecting voltage at a level corresponding to the deviation from the center frequency $(44-\frac{1}{4})f_H$ of the actual frequency then being applied through switching circuit SW$_9$. The output of frequency detector 95 is shown to be alternatively applied through a switching circuit SW$_{10}$ to contacts a and b of the latter. The switching circuits SW$_9$ and SW$_{10}$ are ganged and operated only in the playback or reproducing mode of operation of circuit 10c so as to alternately engage their respective contacts a and b at a change-over frequency of 30 Hz. Thus, during one frame of the color video signal being reproduced, switching circuits SW$_9$ and SW$_{10}$ will engage their respective contacts a to provide at contact a of switching circuit SW$_{10}$ a detecting voltage representing a phase error, that is, the deviation of the oscillation output of voltage controlled oscillator 12'a from the center frequency $(44-\frac{1}{4})f_H$. During the next frame interval of the color video signal being reproduced, switching circuits Sw$_9$ and SW$_{10}$ engage their respective contacts b to provide at contact b of switching circuit SW$_{10}$ a detecting voltage representing a frequency error, that is, the deviation of the oscillation output of voltage controlled oscillation 12a from the center frequency $175f_H$.

The detecting voltages alternately applied from frequency detector 95 to contacts a and b of switching circuit SW$_{10}$, and which may be considered to represent phase and frequency errors, respectively, are applied through amplifiers 98a and 98b for charging capacitors 99a and 99b, respectively. Thus, capacitors 99a and 99b act to hold the alternately sampled phase and frequency errors, and the charges on capacitors 99a and 99b are applied to + and − inputs of a threshold amplifier 100 which has its output connected to adder 22. Threshold amplifier 100 responds to the difference between the phase and frequency error signals represented by the charges on capacitors 99a and 99b, respectively, and is operative to apply a corresponding DC voltage through adder 22 to voltage controlled oscillator 12'a only when the difference between the error signals applied to the + and − inputs exceeds a predetermined range corresponding to the coring range of amplifier 100.

It will be apparent from the above description of signal processing circuit 10c that, in the playback or reproducing mode of operation thereof, small time base errors in the reproduced chrominance component are eliminated by the automatic phase control circuit (APC) and, so long as such errors are within the lock-in range of the automatic phase control circuit, the automatic frequency control circuit (AFC) does not affect the output of voltage controlled oscillator 12'a. However, when the detected time base error exceeds the lock-in range of the automatic phase control circuit (APC), the increase in the frequency error signal relative to the phase error signal causes the threshold amplifier 100 to provide an output further controlling voltage controlled oscillator 12'a for returning to the lock-in range of the automatic phase control circuit.

Figure 11:
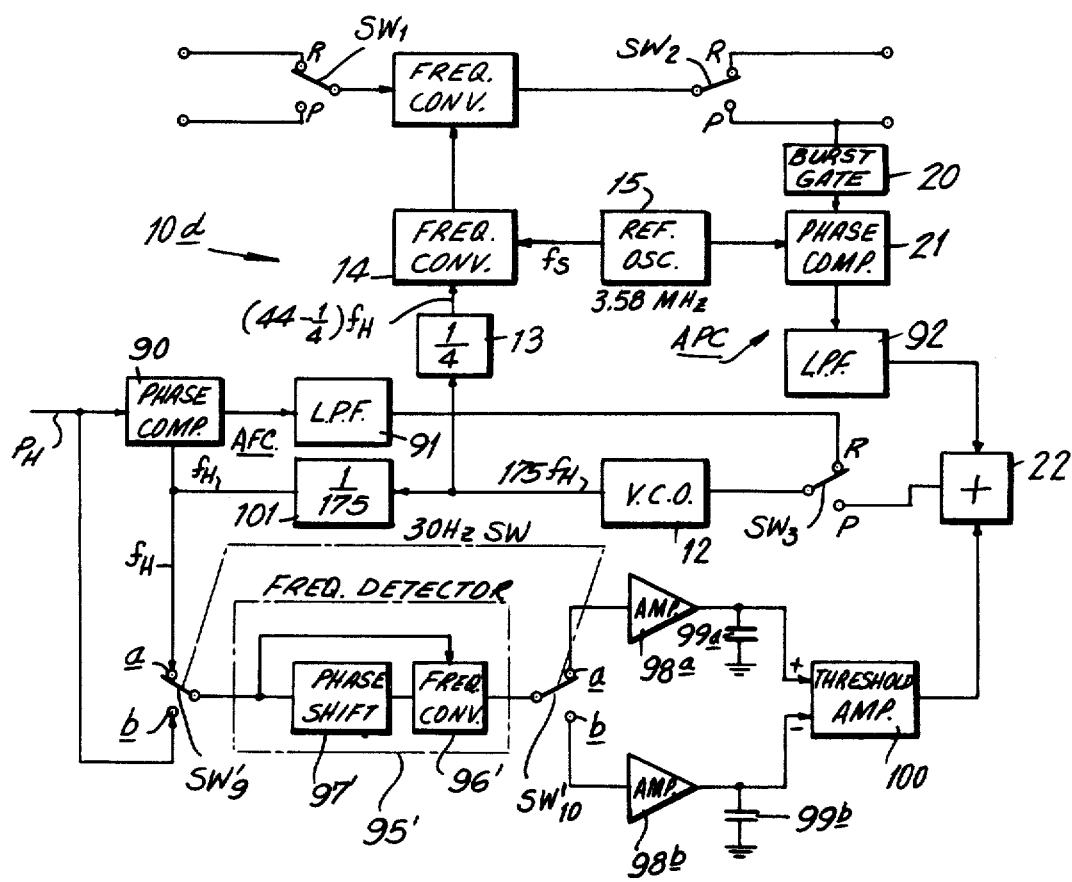

Referring now to FIG. 11, it will be seen that, in a signal processing circuit 10d in accordance with this invention which is generally similar to the circuit 10c of FIG. 10, a single voltage controlled oscillator 12 with an oscillation output having a center frequency of $175f_H$ is employed. Further, any components of circuit 10d which correspond to components of previously described embodiments of the invention are identified by the same reference numerals. More particularly, the oscillation output of oscillator 12 is divided by four in a frequency divider 13 to provide a signal with the center frequency $(44-\frac{1}{4})f_H$ which is applied to a frequency converter 14 along with the oscillation signal from reference oscillator 15. Thus, as before, the output of frequency converter 14 is the necessary frequency converting signal to be applied to frequency converter 11 for either frequency converting the chrominance component to a relatively low color subcarrier frequency during recording or for reconverting the reproduced chrominance component back to the standard color subcarrier frequency during reproducing.

In the recording mode of operation of circuit 10d, the output of oscillator 12 is further divided by one hundred and seventy-five in a frequency divider 101 to provide an oscillation output having the center frequency $f_H$ which is compared, in a phase comparator 90, with the horizontal synchronizing signals $P_H$ separated from the color video signal being recorded. The resulting output of phase comparator 90 is applied through a low pass filter 91 to contact R of switch SW₃ and through the latter to voltage controlled oscillator 12 for controlling the latter and thereby ensuring that the oscillation output of oscillator 12 will be synchronized with the horizontal synchronizing signals.

In the reproducing or playback mode of operation of circuit 10d, switch SW₃ is changed-over to engage its contact P so that voltage controlled oscillator 12 is thereafter controlled by the output of adder 22. During reproducing or playback, burst signals extracted by gate 20 from the reconverted chrominance component are compared in phase comparator 21 with the reference oscillation from oscillator 15 to provide a corresponding DC voltage or phase error signal applied through filter 92 to adder 22. So long as time base errors occurring in the reproduced chrominance component are within the lock-in range of the automatic phase control circuit (APC) constituted by reference oscillator 15, gate 20, phase comparator 21, filter 92, adder 22, oscillator 12, divider 13 and frequency converters 11 and 14, such time base errors are eliminated from the reconverted chrominance component by the automatic phase control action.

It is further to be seen that, in signal processing circuit 10d, the oscillation output of frequency divider 101 having a center frequency of $f_H$ is also applied to a contact a of a switching circuit SW'₉ which also has a contact b receiving the horizontal synchronizing signals $P_H$ suitably separated from the reproduced color video signal during the reproducing or playback operation of circuit 10d. Switching circuit SW'₉ is connected to the input of a frequency detector 95' similar to the previously described frequency detector 95 and being generally comprised of a phase shifter or delay 97' and a frequency converter 96'. The output of frequency detector 95' is connected to a switching circuit SW'₁₀ having contacts a and b respectively connected through amplifiers 98a and 98b to capacitors 99a and 99b. As in the case of the switching circuits SW₉ and SW₁₀, the switching circuits SW'₉ and SW'₁₀ are ganged and, during reproducing or playback, are changed-over at the frequency or rate of 30 Hz so as to alternately provide detecting voltages respectively representing the deviation of the output of frequency divider 101 from the center frequency $f_H$ and the deviation of the horizontal synchronizing signals $P_H$ from the frequency $f_H$. Such DC voltages representing phase and frequency errors, respectively, of the reproduced chrominance component are held by capacitors 99a and 99b and, when there is sufficient difference therebetween, threshold amplifier 100 responds thereto by applying a suitable DC voltage through adder 22 and switch SW₃ to voltage controlled oscillator 12. Thus, whenever the time base error in the reproduced chrominance component exceeds the lock-in range of automatic phase control circuit (APC), threshold amplifier 100 of circuit 10d provides an additional correcting voltage to oscillator 12 for return to the lock-in range of the automatic phase control circuit.

Figure 12:
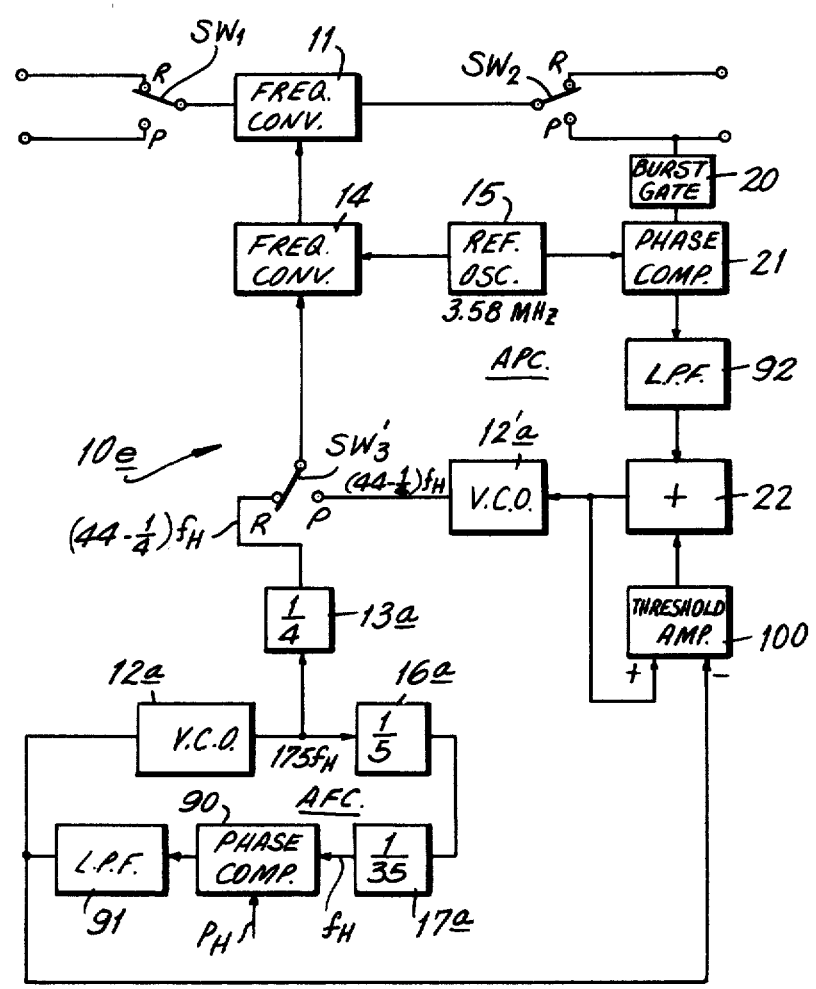

Referring now to FIG. 12, it will be seen that the signal processing circuit 10e according to this invention, as there illustrated, is generally similar to the circuit 10a previously described with reference to FIG. 8, and that the components of circuit 10e which corresponds to components in circuit 10a are identified by the same reference numerals. More particularly, in the recording operation of circuit 10e, the oscillation output of voltage controlled oscillator 12a is divided by four in frequency divider 13a to provide a signal with the frequency of $(44-\frac{1}{4})f_H$ which is applied through contact R of switch SW'₃ to frequency converter 14 for combining in the latter with the oscillation signal from reference oscillator 15 to provide the frequency converting signal to frequency converter 11. During reproducing operation of circuit 10e, the oscillation signal with a center frequency $(44-\frac{1}{4})f_H$ is applied to frequency converter 14 through contact P of switch SW'₃ from voltage controlled oscillator 12'a which is normally controlled to eliminate time base errors within the lock-in range of the automatic phase control circuit (APC) by the DC voltage or phase error from phase comparator 21 applied through filter 92 and adder 22 to voltage controlled oscillator 12'a. The output of adder 22 representing the phase error signal is further shown to be applied to a + input of a threshold amplifier 100 which, at its − input, receives a frequency error signal. More particularly, in the automatic frequency control circuit (AFC) of circuit 10e, the output of voltage controlled oscillator 12a is successively divided in frequency divider 16a and 17a so as to provide an output from the latter with the center frequency of $f_H$. Such output from frequency divider 17a is compared, in phase comparator 90, with the horizontal synchronizing signals $P_H$ separated from the reproduced color video signal to provide a corresponding DC voltage or frequency error signal supplied through filter 91 to voltage controlled oscillator 12a and also the the − input of threshold amplifier 100. It will be apparent that, when the time base error of the reproduced chrominance component exceeds the lock-in range of the automatic phase control circuit (APC) the difference between the DC voltages or error signals applied to the + and − inputs of threshold amplifier 100 will exceed the coring range of the latter, that is, will be sufficiently large to cause amplifier 100 to provide a DC voltage through adder 22 to voltage controlled oscillator 12'a. As a result of the foregoing, return to the lock-in range of the automatic phase control circuit will be achieved. On the other hand, so long as the time base errors are within the lock-in range of the automatic phase control circuit, the output of threshold amplifier 100 will remain at a zero level and, accordingly, the voltage controlled oscillator 12'a will be influenced only by the automatic phase control circuit.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for eliminating time base errors from an information signal, comprising:
   frequency converting means for frequency converting the information signal with a frequency converting signal;
   means including variable oscillating means for generating said frequency converting signal;
   automatic phase control means having a predetermined lock-in range and being responsive to time base errors of the information signal within said range to provide a respective phase error signal for controlling said variable oscillating means in the sense to eliminate such time base errors from the frequency converted information signal;
   automatic frequency control means responsive to time base errors of the information signal to provide a respective frequency error signal; and
   means for further controlling said variable oscillating means in response to said frequency error signal only when the latter corresponds to time base errors of the information signal that are beyond said lock-in range of the automatic phase control means.

2. Apparatus according to claim 1; in which said means for further controlling said variable oscillating means includes a threshold amplifier receiving said frequency error signal and providing a corresponding control signal to said variable oscillating means only when said frequency error signal is outside of a cored range of said amplifier.

3. Apparatus according to claim 2; in which said automatic frequency control means includes dividing means providing a frequency divided output of said variable oscillating means, means for smmpling said frequency divided output with a reference frequency of said information signal and providing a sampled output, and frequency detecting means receiving said sampled output and providing a corresponding frequency error signal to said threshold amplifier.

4. Apparatus according to claim 2; in which said automatic frequency control means includes second variable oscillating means, means providing a frequency divided output of said second variable oscillating means and comparing the same with a reference frequency of said information signal to produce a control signal for said second variable oscillating means, means for frequency converting an oscillation output cf the first mentioned variable oscillating means with an oscillation output of said second variable oscillating means to provide a frequency converted oscillation output, and frequency detecting means receiving said frequency converted oscillation output and providing a corresponding frequency error signal to said threshold amplifier.

5. Apparatus according to claim 1; in which said means for further controlling said variable oscillating means includes threshold amplifier means having inputs respectively receiving said phase error signal and said frequency error signal and providing a corresponding control signal to said variable oscillating means when the difference between said phase and frequency error signals is beyond a predetermined cored range of said amplifier.

6. Apparatus according to claim 1; in which said information signal is the chrominance component of a color video signal containing burst signals and horizontal synchronizing signals; said automatic phase control means includes means for extracting said burst signals from the frequency converted chrominance component, a source of a reference oscillation, and comparator means for providing said phase error signal on the basis of phase comparison of said extracted burst signals with said reference oscillation; and said automatic frequency control means includes dividing means providing a frequency divided output of said variable oscillating means, and means for comparing said frequency divided output with said horizontal synchronizing signals to provide said frequency error signal on the basis of the latter comparison.

7. Apparatus according to claim 6; in which said variable oscillating means is constituted by a single voltage controlled oscillator.

8. Apparatus according to claim 7; in which said means for comparing the frequency divided output with said horizontal synchronizing signals includes waveshaping means for generating a sawtooth wave in response to said frequency divided output, means for sampling said sawtooth wave by said horizontal synchronizing signals and providing a corresponding sampled output, and frequency detecting means responsive to said sampled output to provide said frequency error signal.

9. Apparatus according to claim 8; in which said means for further controlling said variable oscillating means includes a threshold amplifier receiving said frequency error signal from said frequency detecting means and providing a corresponding control voltage to said single voltage controlled oscillator only when said frequency error signal is outside of a cored range of said amplifier.

10. Apparatus according to claim 7; in which means for comparing said frequency divided output with said horizontal synchronizing signals includes frequency detecting means operative to provide a voltage output in correspondence to the frequency of a signal applied thereto, first switch means alternately applying said frequency divided output and said horizontal synchronizing signals to said frequency detecting means, second switch means synchronized with said first switch means, and first and second hold means alternately receiving the voltage output from said frequency detecting means through said second switch means; and in which said means for further controlling said variable oscillating means includes a threshold amplifier having first and second inputs respectively connected to said first and second hold means and providing a control voltage to said single voltage controlled oscillator only when the voltage outputs of said frequency detecting means held by said first and second hold means differ from each other by at least a predetermined amount.

11. Apparatus according to claim 6; in which said variable oscillating means includes a first voltage controlled oscillator having an oscillation output included in said converting signal and being determined by said phase error signal, and a second voltage controlled oscillator having an oscillation output applied to said dividing means to provide said frequency divided output compared with said horizontal synchronizing signals; and in which said means for further controlling the variable oscillating means includes frequency detecting means operative to provide a voltage output in correspondence to the frequency of a signal applied thereto, first switch means alternately applying oscillation outputs of said first and second voltage controlled oscillators, respectively, to said frequency detecting means, second switch means synchronized with said first switch means, first and second hold means alternately receiving the voltage output from said frequency detecting means through said second switch means, and a threshold amplifier having first and second inputs respectively connected to said first and second hold means and providing a control voltage to said first voltage controlled oscillator only when the voltage outputs of said frequency detecting means held by said first and second hold means differ from each other by at least a predetermined amount.

12. Apparatus according to claim 6; in which said variable oscillating means includes a first voltage controlled oscillator having an oscillation output included in said converting signal and being controlled by said phase error signal, and a second voltage controlled oscillator having an oscillation output applied to said dividing means to provide said frequency divided output compared with said horizontal synchronizing signals, with said second voltage controlled oscillator being controlled by said frequency error signal; and in which said means for further controlling the variable oscillating means includes a threshold amplifier having first and second inputs respectively receiving said phase error signal and said frequency error signal and providing an additional control voltage to said first voltage controlled oscillator when said phase and frequency error signals differ from each other by at least a predetermined amount.

13. Apparatus for recording and reproducing, in successive parallel tracks on a record medium a color video signal comprised of luminance and chrominance components with horizontal synchronizing signals and burst signals included therein, comprising;

transducer means for scanning said successive parallel tracks on the record medium;

a recording section including modulating means for frequency modulating a carrier with said luminance component, frequency converting means for frequency converting said chrominance component from an original color subcarrier frequency to a relatively lower color subcarrier frequency in a band lower than that of the frequency modulated luminance component, and means combining the frequency modulated luminance component with the frequency converted chrominance component to form a composite signal applied to said transducer means for recording by the latter in said tracks; and a reproducing section including demodulating means for frequency demodulating the frequency modulated luminance component of the composite signal reproduced by said transducer means from the successive parallel tracks on the record medium, frequency reconverting means for frequency reconverting the chrominance component of the reproduced composite signal back to said original color subcarrier frequency by means of a frequency reconverting signal, means including variable oscillating means for generating said frequency reconverting signal, automatic phase control means having a predetermined lock-in range and being responsive to time base errors of the reproduced signal within said range to provide a respective phase error signal for controlling said variable oscillating means in the sense to eliminate such time base errors from the frequency reconverted chrominance component, automatic frequency control means responsive to time base errors of the reproduced signal to provide a respective frequency error signal, and means for further controlling said variable oscillating means in response to said frequency error signal only when the latter corresponds to time base errors of the reproduced signal that are beyond said lock-in range of the automatic phase control means.

14. Apparatus according to claim 13; in which said means for further controlling said variable oscillating means includes a threshold amplifier receiving said frequency error signal and providing a corresponding control signal to said variable oscillating means only when said frequency error signal is outside of a cored range of said amplifier.

15. Apparatus according to claim 14; in which said automatic frequency control means includes dividing means providing a frequency divided output of said variable oscillating means, means for sampling said frequency divided output with said horizontal synchronizing signals of the reproduced signal and providing a sampled output, and frequency detecting means receiving said sampled output and providing a corresponding frequency error signal to said threshold amplifier.

16. Apparatus according to claim 13; in which said automatic phase control means includes means for extracting said burst signals from the frequency reconverted chrominance component, a source of reference oscillation, and comparator means for providing said phase error signal on the basis of phase comparison of said extracted burst signals with said reference oscillation; and said automatic frequency control means includes dividing means providing a frequency divided output of said variable oscillating means, and means for comparing said frequency divided output with said horizontal synchronizing signals of the reproduced signal to provide said frequency error signal on the basis of the latter comparison.

17. Apparatus according to claim 16; in which said variable oscillating means is constituted by a single voltage controlled oscillator.

18. Apparatus according to claim 17; in which said means for comparing the frequency divided output with said horizontal synchronizing signals includes waveshaping means for generating a sawtooth wave in response to said frequency divided output, means for sampling said sawtooth wave by said horizontal synchronizing signals and providing a corresponding sampled output, and frequency detecting means responsive to said sampled output to provide said frequency error signal.

19. Apparatus according to claim 18; in which said means for further controlling said variable oscillating means includes a threshold amplifier receiving said frequency error signal from said frequency detecting means and providing a corresponding control voltage to said single voltage controlled oscillator only when said frequency error signal is outside of a cored range of said amplifier.

20. Apparatus according to claim 13; in which said recording section further has means including said variable oscillating means for generating a frequency converting signal to be applied to said frequency converting means for frequency converting the chrominance component to said lower frequency band, and automatic frequency control means operative during recording operation of the apparatus for synchronizing said frequency converting signal with said horizontal synchronizing signals.

21. Apparatus according to claim 13; in which said original and relatively lower color subcarrier frequencies of the chrominance component are in frequency interleaving relation to each other and to the horizontal synchronizing signal frequency of the video signal.

22. Apparatus according to claim 21; in which said relatively lower color subcarrier frequency has its second harmonic in frequency interleaving relation to said horizontal synchronizing signal frequency of the color video signal.

23. Apparatus according to claim 13; in which said color video signal is comprised of field intervals and predetermined numbers of line intervals included in each field interval and being recorded in respective areas of said successive parallel tracks; and recording section further includes means for providing different first and second carriers for said chrominance component, carrier selecting means for alternatively selecting the first and second carriers for said chrominance component to be recorded in the tracks, and control means for the carrier selecting means operative to cause the recording of said chrominance component with the first and second carriers therefor, respectively, in said tracks which are next adjacent each other; during reproducing, said transducer means reproducing the frequency modulated luminance component and the chrominance component recorded in each of the tracks along with cross-talk signals from tracks next adjacent thereto; and said reproducing section includes means for providing the chrominance component reproduced from each of said tracks with a common carrier and for eliminating the cross-talk signals therefrom on the basis of said different first and second carriers with which the chrominance component is recorded in the tracks which are next adjacent each other.

24. Apparatus according to claim 23; in which said means for eliminating the cross-talk signals includes a comb filter.

25. Apparatus according to claim 23; in which said first and second carriers for the chrominance component have different polarity characteristics.

26. Apparatus according to claim 25; in which the polarity of said first carrier for the chrominance component is constant during successive line intervals of the video signal being recorded in one of the tracks, and the polarity of the second carrier for the chrominance component is reversed after each predetermined number of said line intervals of the video signal being recorded in the next adjacent track.

27. Apparatus according to claim 13; in which said variable oscillating means provides a first oscillation output included in said frequency reconverting signal during reproducing and also included in a frequency converting signal for said frequency converting of the chrominance component to said lower color subcarrier frequency during recording; said automatic frequency control means includes second variable oscillating means providing a second oscillation output, means frequency dividing said second oscillation output, and comparator means comparing the frequency divided second oscillation output with said horizontal synchronizing signals and correspondingly controlling said second variable oscillating means; and said means for further controlling the first mentioned variable oscillating means includes means for frequency converting said first oscillation output by said second oscillation output to provide a converted oscillation output, frequency detecting means receiving said converted oscillation output to provide a corresponding detected voltage, and a linear amplifier and a threshold amplifier respectively operative during recording and reproducing operations of the apparatus for controlling said first variable oscillating means by said detected voltage.

\* \* \* \* \*